United States Patent [19]
Kazmaier et al.

[11] Patent Number: 6,114,499
[45] Date of Patent: Sep. 5, 2000

[54] PROCESSES FOR THE PREPARATION OF BRANCHED POLYMERS

[75] Inventors: Peter M. Kazmaier, Mississauga; Karen A. Moffat, Brantford; Marko D. Saban, Etobicoke; Richard P. N. Veregin, Mississauga; Michael K. Georges, Guelph; Gordon K. Hamer, Mississauga, all of Canada; Toyofumi Inoue, Kanagawa-Ken, Japan; Stephan V. Drappel, Toronto, Canada

[73] Assignee: Xerox Corporation, Stamford, Conn.

[21] Appl. No.: 09/295,218

[22] Filed: Apr. 21, 1999

Related U.S. Application Data

[62] Division of application No. 08/895,443, Jul. 16, 1997, Pat. No. 5,910,861, which is a division of application No. 08/413,645, Mar. 30, 1995, Pat. No. 5,773,510.

[51] Int. Cl.[7] .............................. C08J 3/20; C08F 279/00
[52] U.S. Cl. ........................... 528/480; 430/965; 525/26; 525/259
[58] Field of Search ............................... 524/500; 525/26, 525/259; 528/480

[56] References Cited

U.S. PATENT DOCUMENTS

| | | | |
|---|---|---|---|
| 4,581,429 | 4/1986 | Solomon et al. | 526/220 |
| 5,017,450 | 5/1991 | Iwanari et al. | 430/106 |
| 5,312,871 | 5/1994 | Mardare et al. | 525/272 |
| 5,322,912 | 6/1994 | Georges et al. | 526/204 |

OTHER PUBLICATIONS

Database WPI, Section Ch, Week 9303, Derwent Publications Ltd., London, GB; Class A89, AN 93–022939, XP002007827 & JP–A–04 350 667 (Nippon Carbide Kogyo KK), Dec. 4, 1992, Abstract.

*Primary Examiner*—Christopher Henderson
*Attorney, Agent, or Firm*—John L. Haack

[57] ABSTRACT

A process for the preparation of branched thermoplastic resins comprising: heating a mixture of an unsaturated resin, a free radical initiator, and a stable free radical agent; adding to the heated mixture at least on polymerizable monomer; and cooling the mixture, wherein the resulting product is a branched thermoplastic resin with arms or branches comprised of polymerized monomer with substantially uniform length and narrow polydispersity.

7 Claims, 6 Drawing Sheets

PROCESSES FOR THE PREPARATION OF BRANCHED POLYMERS

This application is a divisional of application Ser. No. 08/895,443, filed Jul. 16, 1997 now U.S. Pat. No. 5,910,361; which is a divisional of application Ser. No. 08/413,645, filed Mar. 30, 1995 now U.S. Pat. No. 5,773,510.

CROSS REFERENCE TO COPENDING APPLICATIONS AND ISSUED PATENTS

Attention is directed to commonly owned and assigned U.S. Pat. No. 5,322,912, issued Jun. 21, 1994, entitled "POLYMERIZATION PROCESSES AND THEIR TONER COMPOSITIONS THEREFROM", wherein there is disclosed free radical polymerization processes for the preparation of a thermoplastic resin or resins comprising: heating from about 100° C. to about 160° C. a mixture comprised of a free radical initiator, a stable free radical agent, and at least one polymerizable monomer compound to form the thermoplastic resin or resins with a high monomer to polymer conversion and a narrow polydispersity; and U.S. Pat. No. 5,312,704, issued May 17, 1994, entitled "MONOMODAL, MONODISPERSED TONER COMPOSITIONS AND IMAGING PROCESSES", wherein there is illustrated a toner composition comprised of pigment particles, and a resin comprised of a monomodal polymer resin or monomodal polymer resin blends and wherein the monomodal resin or resin blends possess a narrow polydispersity.

Attention is directed to commonly owned and assigned copending applications Application Numbers, U.S. Ser. No. 08/181,134 now U.S. Pat. No. 5,401,804, filed Jan. 4, 1994; U.S. Ser. No. 08/307,192, filed Mar. 25, 1993; continuation-in-part of U.S. Ser. No.07/976,604, now U.S. Pat. No. 5,322,912 filed Nov. 16, 1992, U.S. Ser. No. 08/214,518, filed Mar. 18, 1994, entitled "EMULSION POLYMERIZATION PROCESSES AND TONER COMPOSITIONS THEREFROM"; U.S. Ser. No. 08/223,418, filed Apr. 4, 1994, entitled "AQUEOUS POLYMERIZATION PROCESSES"; U.S. Ser. No. 08/242,490, now U.S. Pat. No. 5,412,047 filed May 13, 1994, entitled "ACRYLATE POLYMERIZATION PROCESSES" wherein there are disclosed improved stable free radical moderated polymerization processes for the preparation of homo- and copolymeric resins containing contiguous acrylate or homoacrylate segments by employing an oxo derivative of the cyclic nitroxide compound TEMPO; U.S. Ser. No. 08/317,044, now U.S. Pat. No. 5,545,504 filed Oct. 3, 1994, entitled "INK JETTABLE TONER COMPOSITIONS AND PROCESSES FOR MAKING AND USING"; U.S. Ser. No. 08/345,371, filed Jan. 3, 1995, entitled "PROCESS FOR PRODUCING THERMOPLASTIC RESIN POLYMERS"; and U.S. Ser. No. 08/367,636 now U.S. Pat. No. 5,530,079, filed Nov. 18, 1994, entitled "POLYMERIZATION PROCESSES"; and U.S. Pat. No. 5,496,679, filed Mar. 30, 1995, entitled "POLYMERIZATION PROCESSES FOR THE PREPARATION OF BRANCHED POLYMERS".

The disclosures of the above mentioned patents and copending applications are incorporated herein by reference in their entirety.

BACKGROUND OF THE INVENTION

The present invention is generally directed to processes for the preparation of branched or dendrimeric homopolymers and copolymers. More specifically, the present invention relates to improved polymerization processes which provide homopolymer and copolymer resin products which possess narrow polydispersity properties and which polymerization processes proceed with high monomer to polymer conversion. In particular, this invention relates to stable free radical mediated or pseudoliving polymerization processes which yield branched homopolymers and copolymers having number average molecular weights ($M_n$) above about 100 to about 200,000 and having a polydispersity ratio of the weight average molecular weight ($M_w$) to the number average molecular weight ($M_n$) of from about 1.0 to about 2.0 and which processes accomplished in accordance with the present invention provide numerous operational and economic advantages.

The present invention provides in embodiments a pseudo-living polymerization process that enables the synthesis of narrow polydispersity branched homopolymer and copolymer resins from a variety of free radical reactive monomers. The process can, in embodiments, use known free radical initiators in combination with nitroxide or non-nitroxide type stable free radical agent compounds and free radical reactive monomers to afford narrow polydispersity dendrimeric thermoplastic resins or elastomers. In other the embodiments, the present invention provides processes for preparing highly branched linear and star type dendrimer molecules by sequentially conducting an alternating series of stable free radical mediated polymer chain extension or growth reactions, at elevated temperatures, wherein monomer is added substantially uniformly, with respect to molecular weight of added monomers, to all of the propagating arms or branches; and chain branching reactions wherein a free radical reactive branching agent is reacted at, for example, lower temperatures with the propagating polymer chains thereby introducing additional branch points in the dendrimer molecule. The sequence can be repeated numerous times and to the extent that the preceding product polymer containing stable free radical terminal functional groups is capable of being thermally activated or otherwise further reacted to provide further chain branching or chain extension propagation.

Many polymerization processes used for the synthesis of narrow polydispersity resins, such as anionic, cationic, and group transfer polymerization processes, are severely limited by the need for anhydrous reaction conditions and monomers which do not contain protic or reactive functional groups, for example, hydroxy (OH) carboxy ($CO_2H$), amino (NH), and the like. As a consequence, these processes are not readily applicable to the polymerization of functionalized monomers since these monomer materials tend to be hydroscopic and any associated water may readily destroy the polymerization initiator component, for example, the hydrolysis or protonation of organolithium reagents by the monomer in anionic polymerization processes, or in other ways cause the polymerization to fail entirely or to be industrially inefficient.

It is generally accepted that known anionic and cationic polymerization processes used for the preparation of branched or dendrimeric narrow polydispersity resins, block and multiblock polymers are not believed possible in aqueous or protic solvent containing polymerization media, or the aforementioned protonic or reactive functional groups, reference commonly assigned U.S. Pat. No. 5,312,704.

Of the known polymerization processes a preferred way to prepare branched or dendrimer polymers or copolymers having a narrow molecular weight distribution or polydispersity is by anionic processes. The use and availability of branched or star type resins having narrow polydispersities in industrial applications is limited because anionic polymerization processes must be performed in the absence of atmospheric oxygen and moisture, require difficult to handle and hazardous initiator reagents, and consequently such polymerization processes are generally limited to small batch reactors. In addition, the monomers and solvents that are used must be of high purity and anhydrous thereby rendering the anionic process more expensive than alternatives which do not have these requirements. Thus, anionic polymerization processes for the preparation of branched or star type polymers are difficult and costly. It is desirable to have free radical polymerization process that provides narrow molecular weight distribution branched or star type polymers and resins that overcomes the shortcomings and disadvantages of the aforementioned related anionic branching polymerization processes.

Similarly, group transfer polymerization (GTP) processes have limitations and disadvantages, such as anhydrous reaction conditions and expensive reagents, which disadvantage GTP processes particularly for large scale industrial preparation of branched or star polymers.

Free radical polymerization processes are generally chemically less sensitive than anionic processes to impurities in the monomers or solvents typically used and are substantially or completely insensitive to water. There has been a long felt need for an economical free radical polymerization processes which are suitable for preparing narrow polydispersity branched or star type resins in the presence of water.

Conventional free radical polymerization processes that are used to polymerize monomers in general, and functionalized monomers in particular, inherently give broad polydispersity resin products or require that sophisticated processing conditions and materials handling protocols be employed.

Star polymers or dendrimers can be constructed either with a rod-like tertiary structure or a spherical tertiary structure. The branching associated with these systems provide a number of unusual properties. For example, in contrast to linear polymers, the viscosity of spherical star polymers decrease as the molecular weight increases. Furthermore, compounding hydrocarbon dendrimers in a variety of media imparts increased strength to these materials.

For example, E. L. Hillier, U.S. Pat. No. 4,048,254, has described the improvement of thermoplastic resins by blending in polystyrene star polymers. T. E. Kiovsky, U.S. Pat. No. 4,077,893, has described the use of star polymers for improving the viscosity index of lubricating oils. Kiovsky has also described the use of these materials as a dispersant. W. R. Haaf et al, U.S. Pat. No. 4,373,055, has shown that the impact strength of polyphenylene ether resins can be improved by the addition of hydrocarbon star polymers while other similar applications have also been described by M. H. Lehr, U.S. Pat. No. 4,181,644, W. P. Gergen et al., U.S. Pat. No. 4,242,470, and A. Aoki et al., U.S. Pat. No. 4,304881. Other illustrative example of star polymers and their properties are disclosed in H. Eschway, M. L. Hallensleben, and W. Burchard, *Makromolek. Chem.*, 173, 235 (1973), and D. A. Tomalia, A. M. Naylor, and W. A. Goddard III, in *Angew. Chem. Int. Ed. Engl,.* 29, 138 (1990).

In commonly owned and assigned U.S. Pat. Nos. 5,098,475 and 5,120,361, there are illustrated inks with dendrimers, and more specifically, in U.S. Pat. No. 5,098,475, the disclosure of which is totally incorporated herein by reference, there is disclosed an ink composition which comprises an aqueous liquid vehicle and a colored dendrimer, or dendricolorant obtained by attaching a reactive dye or dyes to commercially available amino terminated dendrimers, that is for example a dendrimer having an amine group such as $NH_2$ attached to the end of the arm farthest removed in distance from the core, which dendrimers can be of the first, second, third, or n-th generation, wherein n is a number of preferably less than 9, and more specifically is a number of from about 1 to about 8, and wherein the attachment reaction can be accomplished at room temperature in water.

Branched copolymers prepared by conventional free radical polymerization processes inherently have broad molecular weight distributions or polydispersities, generally greater than about four. One reason is that most free radical initiators selected have half lives that are relatively long, from several minutes to many hours, and thus the polymeric chains are not all initiated at the same time and which initiators provide growing chains of various lengths at any time during the polymerization process. Another reason is that the propagating chains in a free radical process can react with each other in processes known as coupling and disproportionation, both of which are chain terminating and polydispersity broadening reaction processes. In doing so, chains of varying lengths are terminated at different times during the reaction process which results in branched resins comprised of polymeric chains which vary widely in length from very small to very large and thus have broad polydispersities. If a free radical polymerization process is to be enabled for producing branched, dendrimeric, or star polymers with narrow molecular weight distributions, then all polymer chains must be initiated at about the same time and premature termination by coupling or disproportionation processes must be avoided or eliminated.

Practitioners in the art have long sought an inexpensive, efficient and environmentally efficacious means for producing branched polymers having operator controllable or selectable molecular weight and branching properties, and further, processes which selectively afford a wide variety of different polymer product types and have narrow molecular weight distribution properties.

In the aforementioned U.S. Pat. No. 5,322,912 there is disclosed free radical polymerization processes for the preparation of a thermoplastic resin or resins comprising: heating from about 100 to about 160° C. a mixture comprised of a free radical initiator, a stable free radical agent, and at least one polymerizable monomer compound to form the thermoplastic resin or resins with a high monomer to polymer conversion and a narrow polydispersity. A broad spectrum of free radical reactive monomers are suitable for use in the highly versatile polymerization process. While a variety of homopolymers and copolymers, including block and multiblock copolymers, could be prepared with high conversions and narrow polydispersities, no mention was made or suggested to include a branching agent in the polymerization process or to prepare branched, star, or dendrimeric polymer resins.

The following patents are of interest to the background of the present invention, the disclosures of which are incorporated by reference herein in their entirety:

In European Patent Publication 349,270 B1, filed Jun. 6, 1988 (US), is disclosed a pressure-sensitive adhesive composition characterized by comprising: a block copolymer represented by the general formula $I(BAT)_n$ wherein I represents the free radical initiator portion of an iniferter of the formula $I(T)_n$; T represents the termination portion of said iniferter; n is an integer of at least 2; and B represents an elastic acrylic polymer block having a glass transition temperature of at least 30° C. and an A-block is formed of a monomer selected from the group consisting of methyl methacrylate, polystyrylethyl methacrylate, macromer, methyl methacrylate macromer, acrylic acid, acrylonitrile, isobornyl methacrylate, N-vinyl pyrrolidone, and mixtures thereof, the weight ratio of said B-block to said A-block in said block copolymer being from 95:5 to 50:50; and 0 to 150 parts by weight tackifier per 100 parts block copolymer. Also disclosed is a method of making the pressure sensitive adhesive which relies upon mixing and exposing an iniferter of the formula $I(T)_n$ to an energy source in the presence of a sequence of monomer charges.

U.S. Pat. No. 4,581,429 to Solomon et al., issued Apr. 8, 1986, discloses a free radical polymerization process which controls the growth of polymer chains to produce short chain or oligomeric homopolymers and copolymers including block and graft copolymers. The process employs an initiator having the formula (in part) =N—O—X, where X is a free radical species capable of polymerizing unsaturated monomers. The molecular weights of the polymer products obtained are generally from about 2,500 to 7,000 having polydispersities generally of about 1.4 to 1.8, at low monomer to polymer conversion. The reactions typically have low conversion rates and use relatively low reaction temperatures of less than about 100 degrees C, and use multiple stages.

European Patent Publication No. 0135280 corresponding to European Patent Application No. EP 84 304,756 is the European Patent Office equivalent of the aforementioned U.S. Pat. No. 4,581,429.

In *Polymer Preprints*, 35 (1), 778 (1994), Matyjaszewski et al., is disclosed thermal polymerizations of styrene monomers in the presence of stable radicals and inhibitors, but without a free radical initiator present, such as peroxide or azo compounds.

In the *Journal of the American Chemical Society*, 1994, 116, p. 11185–11186, is disclosed free radical polymerization processes for the preparation of narrow polydispersity polymers, such as polystyrene, and block copolymers, such as poly(styrene-b-acetoxymethyl styrene), using a free radical initiator, such as benzoyl peroxide, a stable free radical compound such as TEMPO, and a monomer, in accordance with the prior teachings of Georges et al., *Macromolecules*, 1993, p. 26, 2987, which prior teaching is based on the aforementioned commonly assigned U.S. Pat. No. 5,322,912.

In U.S. Pat. No. 5,268,437, to Holy, issued Dec. 7, 1993, discloses a high temperature aqueous processes for the polymerization of monoethylenically unsaturated carboxylic monomer to produce low molecular weight, water-soluble polymer products useful as detergent additives, scale inhibitors, dispersants and crystal growth modifies. Suitable monomers include acrylic acid, methacrylic acid, maleic acid, maleic anhydride, crotonic acid, and itaconic acid. The reactions are run at temperatures ranging from about 130 to 240° C., preferably from about 140 to about 230° C., with polydispersities less than 2.5. The process can be continuous, semicontinuous, or batch.

In U.S. Pat. No. 4,546,160, to Brand et al., issued Oct. 8, 1985, is disclosed a process to continuously bulk polymerize acrylic monomers to prepare low molecular weight, uniform polymers employing minor amounts of initiator and, optionally solvents, at short residence times and moderate reaction temperatures to provide high yields of a product with polydispersities less than 3, suitable for high solids applications.

U.S. Pat. No. 5,059,657 to Druliner et al., issued Oct. 22, 1991, discloses a polymerization process for acrylic and maleimide monomers by contacting the monomers with a diazotate, cyanate or hyponitrite, and N-chlorosuccinimide, N-bromosuccinimide or a diazonium salt. The polymer produced can initiate further polymerization, including use in block copolymer formation.

U.S. Pat. No. 4,736,004 to Scherer, Jr. et al., issued Apr. 5, 1988, discloses novel persistent perfluorinated free radicals which, upon thermal decomposition, yield free radical species which can be used to polymerize polymerizable monomers containing ethylenic unsaturation.

U.S. Pat. No. 3,600,169 to Lawton, issued Aug. 17, 1971, discloses an electrostatic light sensitive reproduction sheet employing a composition comprising in an insulating resinous binder an organic stable free radical and a precursor sensitive to light to be converted to transient free radicals that are reactive with the stable free radical and to change the conductance of the sheet so that an electrostatic image can be formed. Also disclosed is an extensive listing of stable free radical compounds.

Other references cited in an international search report for the aforementioned commonly owned U.S. Pat. No. 5,322,912 are: *J. Am. Chem. Soc.,* 1983, 5706–5708; *Macromol.,* 1987, 1473–1488; *Macromol.,* 1991, 6572–6577; U.S. Pat. No. 4,628,019 to Suematsu et al., issued Aug. 10, 1986; U.S. Pat. No. 3,947,078 to Crystal, issued Aug. 10, 1976; and U.S. Pat. No. 3,965,021 to Clemens et al., issued Jun. 22, 1976. The cited references disclose alternative means, as discussed above, such as anionic, group transfer, and the like, for preparing polymer resins, and in some instances branched or star type polymers, with narrow polydispersity properties, but which alternative means do not provide the aforementioned convenience and economic advantages of the present invention.

One known method of achieving control of polymer molecular weight is through the use of efficient chain transfer agents, but this approach has several drawbacks. This approach irreversibly incorporates the structure of the chain transfer agent into the polymer chain. This can be undesirable since that structure will have an increasing effect on the properties of the polymer as molecular weight decreases. Furthermore, the chain transfer agents commonly employed are mercaptans. These materials are expensive and have objectionable odors associated with their presence. Other common chain transfer agents are hypophosphites, bisulfites, halogenated hydrocarbons such as carbon tetrabromide, and alcohols. These also add to the cost of the process, introduce undesired functionally or properties to the polymer, can introduce salts into the product, and may necessitate an additional product separation step to remove the chain transfer agent from the reaction mixture.

Another way of lowering the molecular weight of the polymer product is by increasing the amount of free radical initiator. This approach adds considerably to the cost of production and may result in polymer chain degradation, crosslinking, and high levels of unreacted initiator remaining in the product. In addition, high levels of initiator may also result in high levels of salt by-products in the polymer mixture which can be detrimental to polymer performance in many applications. The same is true for chain stopping agents such as sodium metabisulfite.

High levels of metal ions together with high levels of free radical initiator have also been tried as means for controlling molecular weight. This method is taught in U.S. Pat. No. 4,314,044 where the ratio of initiator to metal ion is from about 10:1 to about 150:1 and the initiator is present from about 0.5 to about 35 percent based on the total weight of the monomers. Such an approach is unsuitable for some products, such as water treatment polymers, which can not tolerate metal ion contaminants in the polymer product. In addition, the product is usually discolored due to the presence of the metal ions. Thus, polymerization processes which produce product polymers containing residual non-polymeric materials may be significantly negatively compromised with respect to, for example, appearance, performance and toxicity properties. Polymeric processes which create or contain non-polymeric residual materials are preferably avoided.

The following references are also of interest: U.S. Pat. Nos. 3,682,875; 3,879,360; 3,954,722; 4,201,848; 4,542,182; 4,581,429; 4,777,230; 5,059,657; 5,173,551; 5,191,008; 5,191,009; 5,194,496; 5,216,096; and 5,247,024.

In free radical polymerization reaction processes of the prior art, various significant problems exist, for example difficulties in predicting or controlling both the polydispersity and modality of the polymers produced. These polymerization processes produce polymers with high weight average molecular weights ($M_w$) and low number average molecular weights ($M_n$) resulting in broad polydispersities or broad molecular weight distribution ($M_w/M_n$) and in some instances low conversion. Further, polymerization processes of the prior art, in particular free radical processes, are prone to generating excessive quantities of heat since the polymerization reaction is exothermic. As the viscosity of the reaction medium increases dissipation of heat becomes more difficult. This is referred to as the Trommsdorff effect as discussed and illustrated in *Principles of Polymerization*, G. Odian, 2nd Ed., Wiley-Interscience, N.Y., 1981, page 272, the disclosure of which is entirely incorporated herein by reference. This is particularly the situation for reactions with high concentrations of soluble monomer, for example greater than 30 to 50 percent by weight soluble monomer, which are conducted in large scale reactors with limited surface area and limited heat dissipation capacity. Moreover, the exothermic nature of free radical polymerization processes is often a limitation that severely restricts the concentration of reactants or the reactor size upon scale up.

Further, gel body formation in conventional free radical polymerization processes may result in a broad molecular weight distributions and/or difficulties encountered during filtering, drying and manipulating the product resin, particularly for highly concentrated reactions.

Other disadvantages associated with the prior art methods for preparing branched or star type dendrimeric polymeric materials is the they typically provide products with highly variable branch length, variable branch molecular weight and polydispersities, and variable particle size, for example.

These and other disadvantages are avoided, or minimized with the branching polymerization processes of the present invention.

Thus, there remains a need for branching polymerization processes for the preparation of branched or dendrimeric, narrow polydispersity, polymeric resins by economical and scalable free radical polymerization techniques and which polymers retain many or all of their desirable physical properties, for example, uniform branch or arm length and number, hardness, low gel content, processibility, clarity, high gloss durability, and the like, while avoiding the problems of non-uniform branch length or composition, gel formation, exotherms, volume limited and multi-stage reaction systems, complex purification, encumbered or compromised performance properties due to undesired residuals, broad polydispersity properties of the polymer resin products, and the like, associated with prior art free radical polymerization methodologies.

There also remains a need for polymerization processes which enable the preparation of narrow polydispersity branched or dendrimeric compounds and polymers with high molecular economy and efficiency, and by providing alternative synthetic pathways, such as linear, convergent, and de novo routes, and which compounds and polymerization processes overcome the aforementioned limitations and problems.

The polymerization processes and the resultant branched, dendrimeric and star compounds, thermoplastic resins, and elastomer products of the present invention are useful in many applications, for example, as a variety of specialty applications including toner and liquid immersion development ink resins or ink additives used for electrophotographic imaging processes, or where monomodal or mixtures of monomodal narrow molecular weight resins or block copolymers with narrow molecular weight distribution within each block component are suitable, for example, in thermoplastic films, electrophotographic marking materials such as toners and toner additives, and aqueous or organic solvent borne coating technologies.

SUMMARY OF THE INVENTION

An object of the present invention is to provide stable free radical agent moderated polymerization processes or pseudoliving polymerization processes and branched polymers therefrom that overcome many of the problems and disadvantages of the aforementioned prior art.

In another object of the present invention is provided stable free radical moderated polymerization processes for the preparation of dendrimeric or branched compounds, thermoplastic resins and elastomers.

In another object of the present invention is provided, in embodiments, polymerization processes for the preparation of branched thermoplastic resins comprising: heating a mixture of an unsaturated resin, a free radical initiator, and a stable free radical agent; adding to the heated mixture at least one polymerizable monomer; and cooling the mixture, wherein the resulting product is a branched thermoplastic resin with arms or branches comprised of polymerized monomer with substantially uniform length and narrow polydispersity.

Another object of the present invention, in embodiments, a process for the preparation of branched thermoplastic resins comprising: heating a mixture of an unsaturated resin, and a covalently bonded stable free radical containing, narrow polydispersity, pseudoliving branching agent oligomer or polymer of the formula I—$(M_1)_n$—SFR where I is a free radical initiator fragment, ($M_1$) is a polymeric segment derived from the monomer $M_1$, n is an integer from 1 to 10,000 and represents the number of polymerized monomers in the oligomer or polymer and —SFR is a covalently bonded stable free radical agent; and cooling the mixture, wherein the resulting product is a branched thermoplastic resin with arms or branches of the formula —$(M_1)_n$—I with substantially uniform length and narrow polydispersity, and SFR is covalently bonded to the unsaturated resin.

In another object of the present invention is provided, in embodiments, a process for the preparation of dendrimer or star thermoplastic resins comprising: heating a mixture of an olefinic branching agent of the formula $C(R)_nH_{n-4}$ where n is a number from 3 to 4 and R represents monoolefin containing substituents with from 2 to 25 carbon atoms, a free radical initiator, and a stable free radical agent, to from a stable free radical activated branching agent of the formula $C(R')_n H_{n-4}$ where n is a branch number from 3 to 4 and R' represents saturated substituents in the branching agent which have reacted with, and incorporated therein, a free initiator fragment and a stable free radical agent; heating the stable free radical activated branching agent with at least one monomer; and cooling the mixture, wherein the resulting product is a thermoplastic polymeric dendrimer or star compound of the formula $C(R'')_n H_{n-4}$ where n is an integer from 3 to 4, and R'' represents the branch substituents or arms including the polymerized monomer incorporated therein and wherein each arm has a substantially uniform arm length, narrow polydispersity, and a stable free radical agent covalently bonded to the end of each arm.

The aforementioned processes, in embodiments, may be further exploited by the introduction of a non-polymeric multifunctional branching agents, for example, of the formulas where —SFR is a covalently

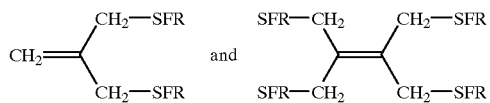

bonded stable free radical agent, for the purpose of providing additional branching points in the branched or dendrimer polymer structure. The polymers so modified by the non-polymeric multifunctional branching agents can be subsequently reacted with additional free radical reactive monomers under conventionional free radical polymerization conditions, or preferably, under the aforementioned stable free radical moderated polymerization conditions thereby providing a means for further chain extension. The non-polymeric multifunctional branching agents may be introduced, in embodiments, by for example, heating or by photochemical means, whereby the non-polymeric branching agents are covalently bonded to the polymer structure in high yield with little or no side reactions or degradation.

It is also an object of the present invention to provide branching polymerization processes for the production of branched diblock and multiblock polymers with high monomer to polymer conversion, narrow polydispersity properties, and uniform branch or arm lengths.

It is a further object of the present invention to provide branching polymerization processes which do not require the use of water or organic solvents, or chain transfer agents as a means of controlling the molecular weight of the resulting polymers.

Another object of this invention is to provide polymerization processes which result in narrow polydispersity branched thermoplastic and elastomer resin products having number average molecular weights above about 1,000.

Another object of this invention is to provide branched thermoplastic resin and elastomer mixtures having number average molecular weights above about 1,000 to about 200,000 and a polydispersity within the range of from about 1.0 to about 2.0 and which polydispersities are easily selectable and controllable by an operator.

Another object of this invention is to provide a branched polymer or branched polymer mixtures having sufficiently low polydispersity properties and high monomer conversions such that residual monomer levels are low and are within industrially acceptable levels so as to avoid additional monomer removal or recovery steps.

Another object of the present invention is to provide branching polymerization reaction systems which affords branched narrow polydispersity homopolymeric or copolymeric thermoplastic resin products in high yield.

Another object of the present invention is to provide branching polymerization reaction systems which may be conducted in the presence of a minimum amount of conventional reaction media such as water and mixtures of water and water miscible organic solvents.

In yet another object of the present invention, coupling or disproportionation termination reactions are substantially minimized or eliminated by reversibly terminating the propagating free radical chains or arms with one or more stable free radical agent compounds which control arm length and moderate the exothermicity and modality properties of the polymerization processes.

In another object of the present invention is provided the acceleration of the dissociation of free radical peroxide initiator compounds by the addition of dissociation promoter compounds which include, for example, tertiary amines, which compounds ensure that all branched polymeric chains are initiated nearly simultaneously or at about the same time very early on in the polymerization process.

In another object of the present invention is the addition of small amounts of organic or inorganic acids, for example, organic sulfonic and carboxylic acids, to the reaction medium to alter the normal rate of unsaturated polymer or unsaturated monomer reaction without significantly broadening the polydispersity of the branched polymeric resins and without inducing autopolymerization effects.

Still another object of the present invention is to prepare water soluble branched thermoplastic resins or elastomers by single pot processes employing suitable monomer, monomers, or unsaturated polymers, free radical initiator, optional minimal amounts of an emulsifier or surfactant which may provide rate enhancement or simplify isolation, but avoids emulsification or phase separation during the polymerization, and stable free radical agent compounds which compounds form thermally labile bonds with propagating polymeric free radical species, wherein the aforementioned thermally labile bond is labile at temperatures above of from about 100° C.

Another object of the present invention is to prepare branched thermoplastic resins and elastomers using polymerization processes wherein the molecular weight of the growing polymer or copolymer chains, arms or branches, increase over the entire time period of the polymerization reaction, and wherein the percent conversion or degree of polymerization of monomer to polymer with respect to time or number average molecular weight is approximately linear, that is, polymerization processes which occur without the aforementioned Trommsdorff effect.

Moreover, another object of the present invention is to provide polymerization processes for the preparation of branched thermoplastic resins and elastomers with narrow polydispersity properties and which polymerization processes are accomplished in a time efficient and economic manner by the optional addition of dialkyl sulfoxides promoter compounds, such as dimethyl sulfoxide (DMSO), and which promoter compounds enable a greater narrowing of the polymer product polydispersity during product formation. The dialkyl sulfoxide additives are preferably liquid at the polymerization reaction temperature and may be used in amounts from about several tenths of a weight percent of the total reaction mixture, to use in amounts as the exclusive reaction solvent or reaction media, for example, in excess of 95 percent by weight of the monomer being polymerized.

A further object of the present invention provides, in embodiments, hydrocarbon star and branched polymers. The dendrimer polymers are prepared by a stable free radical mediated polymerization or addition processes wherein precise control over the length of the oligomer or polymeric arms or side chains is maintained throughout the process. This control provides substantial advantages in application areas of, for example, viscosity modification, matrix strengthening, and thermoplastic clarity improvement, since these properties depend to a substantial extent on the tertiary structure of the branched polymer, and which tertiary structure can be controlled and therefore well defined.

In yet another object of the present invention is provided, in embodiments, non-polymeric and polymeric branching agents having a plurality of covalently bonded stable free radical species as illustrated herein and as disclosed in the aforementioned copending applications, reference for example, the U.S. Pat. No. 5,498,679.

In still yet another object of the present invention is provided, in embodiments, branched thermoplastic polymer resins or elastomers containing a plurality of covalently bound stable free radical terminal groups which possess high levels of thermal activation, that is high dissociability from polymeric species at elevated temperatures, and high reactivity with highly reactive or unstable free radical species such as unsaturated monomers that have reacted with a free radical initiator and propagating free radical species polymers.

Other objects of this invention will be apparent to those skilled in the art in light of the present disclosure and appended claims.

DETAILED DESCRIPTION OF THE INVENTION

Figure 1:
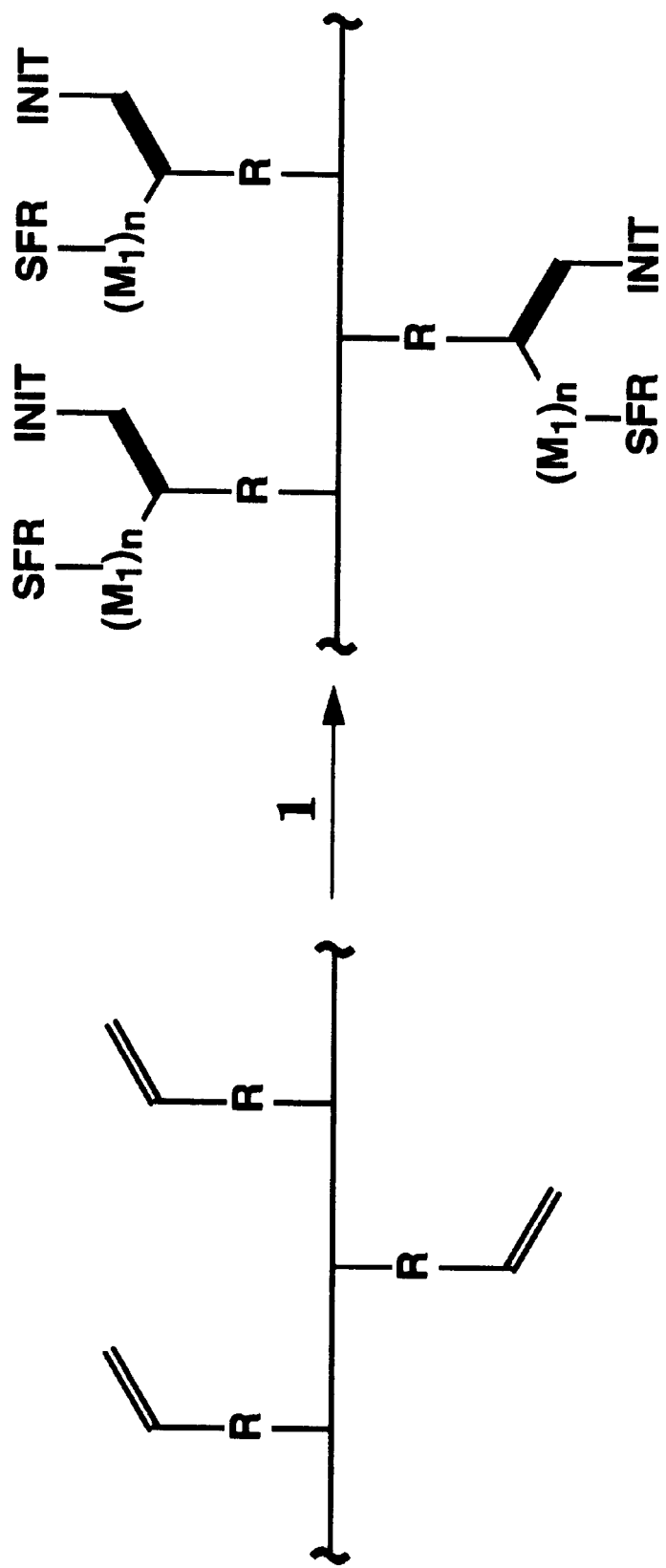
FIG. 1 illustrates an exemplary linear synthetic embodiment for preparing branched polymers of the present invention.

The present invention provides stable free radical mediated polymerization processes for preparing branched polymers, such as dendrimeric thermoplastic resins or elastomeric materials with well defined molecular structure, molecular weight properties, and narrow polydispersities. The processes can be run as batch, semi-continuous or continuous processes. The processes can be carried out in solution, bulk, suspension, emulsion, phase transfer, and extrusion reaction conditions. The processes provide for from about 1 to about 99 percent by weight of the reaction mixture to be a free radical reactive monomer or monomer mixtures and the processes can be conducted at from about 100° C. to about 250° C. The processes produce polymer products which have operator selectable low, intermediate, or high molecular weight; well defined branching properties including the branching number and the extent of branching; narrow polydispersity; low residual salt content or are salt free; posses thermal and acidic stability; and low toxicity.

In embodiments, the present invention overcomes many of the problems and disadvantages of the aforementioned related art branching polymerization processes by forming narrow polydispersity branched polymeric resins and wherein high conversion from monomer to polymer is achieved, for example, as illustrated herein.

The stable free radical compound when covalently bound to the branched polymer product preferably has no unpaired electrons, that is, has no free radical character or free unpaired electrons.

Suitable stable free radical compounds for use in the present are known, and can be prepared prior to mixing with the other polymerization reactants or they may be generated in situ or on an as needed basis, reference for example, the aforementioned copending application U.S. Ser. No. 08/345, 375 wherein a hindered secondary amine is converted in situ into a nitroxyl compound prior to stable free radical polymerization, and the non-nitroxyl type stable free radical compounds described in "Free Radicals" Volumes I and II, edited by J. K. Kochi, Wiley-Interscience, New York, 1973, and in the aforementioned U.S. Pat. No. 5,530,079.

The stable free radical agent compounds of the present invention may be generated in any suitable fashion from the corresponding non-free radical precursor, for example, thermally, chemical, electrochemically, photolytically, mechanically, and the like methods.

Examples of suitable and preferred stable free radicals are disclosed in the aforementioned U.S. Pat. No. 3,600,169 to Lawton and include: nitrogen centered stable free radical such as organic hydrazyls, verdazyls, and pyridinyl compounds; non-nitroxide oxygen centered stable free radicals such as aroxyls and the like; and carbon centered stable free radicals such as aryl alkyls and aryl cycloalkyls with the unpaired electron residing on a carbon atom in the alkyl or cycloalkyl substituents.

The preferred stable free radical compounds selected for use in the present invention are chosen so as to enhance stability properties of the overall process and products arising therefrom by providing: stable free radical agent compounds with high thermal, acidic, and photochemical stability; and polymeric products containing the aforementioned preferred or stable free radical compounds and which compounds, in turn impart greater thermal, acidic, and photochemical stability upon the polymeric products.

The term "stabilized" as used in the context of a stabilized stable free radical agent or compound of the present invention is intended to indicate that a bimolecular reaction of the stable free radical compound (SFR•) with another stable free radical compound (SFR•) of the same or similar type or identity, also known as bimolecular "self" reactions, to form a dimeric product (SFR—SFR) does not occur to any significant extent in the presence of free radical initiator (I•) species, free radical reactive monomers (M), or propagating polymeric chain free radical species (P•). "Stable" does not mean that the stable free radical compound (SFR•) will not react with any other molecule or other free radical, such as a propagating polymeric chain free radical (P•). On the contrary, the stable free radical compounds selected for use in the present invention should preferably readily react, that is, with a rate that is faster than the rate of chain propagation and preferably at or near diffusion control, with the incipient or propagating free radical oligomeric or polymeric chains (P•) to be effective. The reverse reaction under the elevated temperature polymerization reaction conditions is believed be equally rapid.

In embodiments, the present invention provides free radical reactive monomer polymerization processes for the preparation of branched thermoplastic resins or elastomer materials comprising heating a mixture of an unsaturated resin, a free radical initiator, and a stable free radical agent; adding to the heated mixture at least one polymerizable monomer; and cooling the mixture, wherein the resulting product is a branched thermoplastic resin with arms or branches comprised of polymerized monomer with substantially uniform length and narrow polydispersity.

One class of monomers suitable for use in the present invention are carboxylic acid or acrylic monomers, that is $C_3$–$C_6$ monoethylenically unsaturated monocarboxylic acids, and the alkali metal and ammonium salts thereof. The $C_3$–$C_6$ monoethylenically unsaturated monocarboxylic acids include acrylic acid, methacrylic acid, crotonic acid, vinylacetic acid, and acryloxypropionic acid. Acrylic acid and methacrylic acid are the preferred monoethylenically unsaturated monocarboxylic acid monomers.

Another class of monomers suitable for the present invention are carboxylic acids, such as $C_4$–$C_6$ monoethylenically unsaturated dicarboxylic acids and the alkali metal and ammonium salts thereof, and the anhydrides of the cis dicarboxylic acids. Suitable examples include maleic acid, maleic anhydride, itaconic acid, mesaconic acid, fumaric acid, and citraconic acid. Maleic anhydride and itaconic acid are preferred monoethylenically unsaturated dicarboxylic acid monomers.

Acid containing monomers useful in this invention may be in their acid forms or in the form of the alkali metal or ammonium salts of the acid. Suitable bases useful for neutralizing the monomer acids include sodium hydroxide, ammonium hydroxide, potassium hydroxide, and the like. The acid monomers may be neutralized to a level of from 0 to 50 percent and preferably from 0 to about 20 percent. More preferably, the carboxylic acid monomers are used in the completely neutralized form. Partial neutralization of the carboxylic acid monomers minimizes or eliminates corrosion on parts of the reactor equipment, but conversion of the monomers into polymer product may be diminished, for the aforementioned reasons. The acidic or labile proton containing monomers may be neutralized prior to, during, or after polymerization. The polymer products are often particularly useful in their partially or completely neutralized form.

In addition, the free radical reactive monomers that are useful in the present invention may be monoethylenically unsaturated carboxylic acid-free monomers. Suitable monoethylenically unsaturated carboxylic acid-free monomers can also be copolymerizable with the carboxylic containing monomers. Typical monoethylenically unsaturated carboxylic acid-free monomers which are suitable for this invention include alkyl esters of acrylic or methacrylic acids such as methyl acrylate, ethyl acrylate, butyl acrylate; hydroxyalkyl esters of acrylic or methacrylic acids such as hydroxyethyl acrylate, hydroxypropyl acrylate, hydroxyethyl methacrylate, and hydroxypropyl methacrylate; acrylamide, methacrylamide, N-tertiary butylacrylamide, N-methylacrylamide, N,N-dimethylacrylamide; acrylonitrile, methacrylonitrile, dimethylaminoethyl acrylate, dimethylaminoethyl methacrylate, phosphoethyl methacrylate, N-vinylpyrrolidone, N-vinylformamide, N-vinylimidazole, vinyl acetate, styrene, hydroxylated styrenes, styrenesulfonic acid and salts thereof, vinylsulfonic acid and salts thereof, and 2-acrylamido-2-methylpropane-sulfonic acid and salts thereof.

Monomers, branched polymers and branched copolymers containing the above mentioned acidic functionality can, in embodiments, be separated from one another or from the polymerization reaction mixture by, for example, changing the pH of the reaction media and other well known conventional separation techniques.

The monomer or monomers to be polymerized in embodiments can be dissolved in water or aqueous mixtures of polar protic or aprotic organic solvents. The resultant aqueous solution usually contains a suitable water-soluble, free-radical generating initiator such as a peroxide or a persulfate, and the like, as defined herein. The monomer or monomers are used in effective amounts relative to the free radical initiator, and stable free radical agent, as defined hereinafter.

Other suitable comonomers include acrylamides, alkyl and aryl amide derivatives thereof, and quaternized alkyl and aryl acrylamide derivatives.

Suitable initiators for the branching polymerization processes of the present invention are any conventional free radical initiators which have a half-life of at least 1 second at the polymerization temperature. Preferably, the initiator will have a half life of from about 10 second to about 2 hours, more preferably from about 10 seconds to about 10 minutes at the polymerization reaction temperature. These initiators include, but are not limited to oxygen, hydrogen peroxide, certain alkyl hydroperoxides, dialkyl peroxides, peresters, percarbonates, peroxides, persulfates and azo initiators. Specific examples of some suitable initiators include hydrogen peroxide, t-butyl hydroperoxide, di-tertiary butyl peroxide, tertiary-amyl hydroperoxide, potassium persulfate, dibenzoyl peroxide, and methylethyl ketone peroxide. The initiators are normally used in amounts of from about 0.05 percent to about 33 percent based on the weight of total polymerizable monomer. A preferred range is from about 0.5 to about 20 percent by weight of the total polymerizable monomer. In embodiments, the molar ratio of monomer to stable free radical agent to free radical initiator compounds is from about 50:0.2:1.0 to about 20,000:2.5:1.0. Preferred free radical initiators do not react with or degrade the stable free radical compounds with the exception of the aforementioned in situ stable free radical generation resulting from the reaction of the stable free radical precursor compound with a free radical fragments species.

The free radical initiator can be any free radical polymerization initiator capable of initiating a free radical polymerization process of unsaturated monomers and includes peroxide initiators such as benzoyl peroxide, persulfate initiators such as potassium persulfate, azo initiators such as azobisisobutyronitrile, and the like. The initiator concentration employed is, for example, about 0.2 to about 16.0 weight percent of the total weight of monomer to be polymerized and is determined by the desired molecular weight of the resin. As the initiator concentration is decreased relative to the weight or molar equivalents of monomer used, the molecular weight or the thermoplastic resin or elastomer product increases.

Water soluble free radical initiators can be optionally employed in the processes of this invention and are those that are traditionally used in aqueous polymerization. Examples of water soluble free radical initiators are: persulfates; water soluble peroxides and hydroperoxides; more specifically, sodium, potassium and ammonium persulfate; peroxides such as hydrogen peroxide, t-butyl hydroperoxide, cumene hydroperoxide, paramenthane hydroperoxide; and peroxy carbonates. Other water soluble initiators of similar decomposition mechanism may be used if desired.

A preferred initiator is one which has a one-hour half-life at about 60 to 95° C. and a ten-hour half-life at about 50 to 80° C. Other peroxides, such as peresters and peracids having somewhat higher one-hour half-life/temperature relationships, may also be used if they are accompanied by a promoter compound such as tertiary amine. Such initiators are, for example: 2,4-dimethyl-2,5-dibenzyl peroxyhexane (138° C.), tert-butyl peroxybenzoate (125° C.), di-tert-butyl diperoxyphthalate (123° C.), methyl ethyl ketone peroxide (133° C.), dicumyl peroxide (135° C.) tert-butyl peroxycrotonate (118° C.), 2,2-bis-t-butyl(peroxybutane) (119° C.), tert-butylperoxy isopropyl carbonate (119° C.), 2,5-dimethyl-2,5-bis(benzoylperoxy)-hexane (118° C.), t-butyl peracetate (120° C.), di-t-butyldiperoxy-phthalate (123° C.), and the like. Still other initiators may also be employed if accompanied by a promoter compound in versions of this process, for example, 2,4-pentanedione peroxide (167° C.), di-t-butyl peroxide (149° C.), 2,5-dimethyl-2,5-di(t-butylperoxy)-hexyne (149° C), 2,5-dimethyl-2,5-di(t-butylperoxy)-hexyne (149° C.), 2,5-dimethyl-2,5-di(t-butylperoxy) hexane (138° C.), and the like. The figures in parentheses are the 1 hour half-life temperatures.

Preferred initiator compounds are: t-butyl peroxy isobutyrate (120° C.); t-butyl peroxy 2-ethylhexanoate (95° C.); t-butyl pivalate (76° C.); and t-amyl peroxy 2-ethyl hexanoate (92° C.). Particularly preferred free radical initiators are azobisalkylnitrile and diaroyl peroxide compounds.

Redox initiators may also be selected. These initiators include, but are not limited to, sodium bisulfite, sodium sulfite, isoascorbic acid, sodium formaldehyde-sulfoxylate, and the like, used with suitable oxidizing agents, such as the thermal initiators noted above. If used, the redox initiators may be used in amounts of 0.05 percent to 16 percent, based on the weight of total monomer. A preferred range is from about 0.5 to about 5 percent by weight of total monomer. Many of these initiators introduce undesired salt by-products into the polymer product. Thus it is preferred that the level of these initiators, if used, be minimized.

The free radical initiator compounds selected must satisfy certain maximum half-life requirements for the purpose of providing efficient and highly controlled polymer chain initiation. The stable free radical agent compounds selected must satisfy certain stability requirements including high thermal stability, and high resistance to degradation by acids or photochemical means. The stable free radical compounds must not initiate nor excessively inhibit or retard the desired branching polymerization processes. The stable free radical agent compounds selected must also satisfy certain bond energy and steric hindrance requirements when the stable free radical agent compound is attached to the end of the propagating polymer chain.

In other embodiments, the polymerization processes of the present invention can be used to prepare branched block copolymers and multi-block polymers having narrow polydispersity properties wherein at least one of the blocks is optionally water soluble thereby providing, for example, a means for preparing branched surface active agents or surfactant materials having well defined polydispersity and hydrophobe-lipophobe balance (HLB) properties.

The present invention describes hydrocarbon star polymers prepared by a stable free radical mediated free radical polymerization process in which precise control over the length of the star side chains is maintained. This control provides substantial advantages in the applications of viscosity modification, matrix strengthening and thermoplastic clarity improvement since these properties depend to a substantial extent on the tertiary structure of the star polymer.

As one unsaturated resin suitable for use as a starting resin for preparing a linearly branched dendrimer product there can be selected the esterification products of an unsaturated dicarboxylic acid and a diol comprising a diphenol. These resins are illustrated in U.S. Pat. No. 3,590,000, the disclosure of which is totally incorporated herein by reference. Other suitable resins include styrene/butadiene copolymers; PLIOLITES™; suspension polymerized styrene butadienes, reference U.S. Pat. No. 4,558,108, the disclosure of which is totally incorporated herein by reference; polyester resins obtained from the reaction of bisphenol A and propylene oxide; followed by the reaction of the resulting product with with an unsaturated condensation monomer such as fumaric acid, and polyester resins resulting from the reaction of dimethylterephthalate, 1,3-butanediol, 1,2-propanediol, styrene acrylates, and mixtures thereof, and at least one unsaturated condensation monomer.

The dendrimers selected for the toner additives of the present invention are, for example, illustrated in the documents mentioned herein. Dendrimers are known, and can be considered radially symmetrical molecules of a STARBURST™ topology comprised of an initiator core, such as nitrogen, ethylenediimine, silicon, and the like, interior layers attached to the core and comprised of, for example, three, four or more arms, each arm being composed of repeating units with the number of repeating units in each arm being considered the generation of the dendrimer, and terminal covalently bonded stable free radical functional groups, such as for example a nitroxyl compound attached to the outermost generation, which dendrimers having related terminal amine terminated groups are illustrated, for example, in U.S. Pat. Nos. 4,507,466; 4,631,337; 4,558,120; 4,568,737 and 4,587,329; and in D. A. Tomalia, A. M. Naylor, and W. A. Goddard III, *Angewandte Chemie, Int. Ed. Engl.*, 29, 138 (1990), the disclosures of which are totally incorporated herein by reference. The size and shape of the STARBURST™ dendrimer molecule and the functional groups present in the dendrimer molecule can be controlled by the choice of the initiator core, the number of generations, and the choice of repeating units employed at each generation. The choice of the dendrimer components can affect the properties of the dendrimers. The initiator core type can affect the dendrimer shape producing, for example, spheroid-shaped dendrimers, cylindrical- or rod-shaped dendrimers, or ellipsoid-shaped dendrimers. Sequential building of generations determines the dimensions of the dendrimers and the nature of its interior. Examples of core materials which have been successfully used include ammonia, polyfunctional alcohols, such as pentaerythritol or tris-(hydroxymethyl)ethane, 1,1,1-tris-(4'-hydroxyphenyl)-ethane, polyfunctional amines, such as ethylene diamine, linear polyethyleneimines, and the like, carbosilanes such as tetravinylsilane as described, for example, in J. Roovers, P. M. Toporowski and L-L. Zhou, *Polymer Preprints,* American Chemical Society, Division of Polymer Chemistry, 33, (1), 182 (1992), and the like; polysiloxysilanes, such as those described, for example, in L. J. Mathias and T. W. Carothers, *J. Am. Chem. Soc.,* 113, 4043 (1991), in H. Uchida, Y. Kabe, K. Yoshino, A. Kawamata, T. Tsumuraya, and S. Masamune, *J. Am. Chem, Soc.,* 112, 7077 (1990), in A. Morikawa, M. Kakimoto, and Y. Imai, *Macromolecules*, 24, 3469 (1991), and the like; polyfunctional aromatic rings, such as benzoic acids, such as 3,5-diacetoxybenzoic acid, as illustrated, for example, in B. I. Voit and S. R. Turner, in *Polymer Preprints*, American Chemical Society, Division of Polymer Chemistry, 33, (1), 184 (1992); hyperbranched polyphenylenes such as those described by Y. H. Kim and O. W. Webster, in *J. Am. Chem. Soc.*, 112, 4592 (1990), hyperbranched polyarylenes, such as those described in U.S. Pat. Nos. 4,857,630 and 5,070,183 to E.I. DuPont de Nemours and Company, and the like. The chemical functionality of the repeating unit in the interior layers can include, for example, amidoamines, such as amino-ethyl acetamide, imines, such as diethylene diimine, ethers such as those obtained from materials such as, for example, 3,5-dihydroxyethyl benzyl alcohol, siloxanes, such as dimethylsiloxane, diethylsiloxane, diphenylsiloxane, and the like, carbosilanes, such as ethyl silane and the like. The terminal functionalities include, for example, amino groups, quaternary ammonium salts, phosphonium salts, hydroxyl groups, carboxylic acid groups, carboxylates, esters, amides, phosphates, sulfonates, and the like. The synthesis of dendrimers usually occurs by a linear, convergent, or divergent aproaches. The divergent approach involves the initial reaction of a monomer with the initiator core, followed by exhaustive reaction of the resulting functional groups with a difunctional compound, such as a diamine, including, for example, ethylene diamine, to afford the next generation of reactive amino groups. Repetition of the two-step procedure leads to subsequent generations. An alternate synthetic route uses a convergent growth synthesis as described in detail in C. J. Hawker and J. M. J. Frechet, *J. Am. Chem. Soc.*, 112, 7638 (1990), the disclosure of which is totally incorporated herein by reference. Examples of dendrimers prepared by the divergent method include STARBURST™ dendrimers available from the Michigan Molecular Institute, Dendrimer Microparticles available from Polysciences, Inc., in which the terminal functional groups are primary amino groups, and which range in average diameter of from about 10.8 Angstroms (first generation) to about 83.9 Angstroms (8th generation). Other dendrimers of interest, in embodiments, of the present invention include those as illustrated in U.S. Pat. Nos. 5,041,516; 4,857,599 and 4,694,064, the disclosures of which are totally incorporated herein by reference.

The present invention, in embodiments, enables the preparation of branched, dendrimeric and star type homopolymers, random copolymers, block and multiblock copolymers, and polymer blends, with operator selectable molecular weight and polydispersity properties, and which preparation was heretofore not readily achievable in free radical, ionic, or group transfer initiated or mediated polymerization systems.

The branched polymer resins produced by processes of the present invention, in embodiments, can be, if desired, essentially monomodal, that is the molecular weight distribution is narrow and indicative of a Poisson character and without shoulders or side bands. In embodiments, by repeating a heating step, comprising the combined initiation, reversible termination, and polymerization reactions, there is provided a means for obtaining monomodal mixtures of branched polymer resins that are compositionally the same resin type having characteristics of both narrow polydispersity and known or selectable modality greater than 1.

In embodiments, processes of the present invention provide a means for conducting pseudoliving free radical branching polymerization processes on multi kilogram or larger scales. The aforementioned embodiments, if desired, can be accomplished in a single pot reactor environment. In embodiments, polymeric chain growth proceeds by a pseudoliving mechanism and can provide dendrimer and branched polymers and resins with molecular weights from very low to very high, for example, less than about 2,000 to about 200,000 and above, while maintaining narrow molecular weight distributions or polydispersities. In embodiments, branched block and multiblock copolymers can be synthesized by the aforementioned stable free radical moderated polymerization processes wherein each block formed is well defined in length by the sequentially added and reacted monomer and wherein each additional block added or formed also possesses a narrow molecular weight distribution.

Free radical branching polymerization processes are known in the art and provide branched or crosslinked resins with broad polydispersities and generally high molecular weights. The present invention relates to branching polymerization processes that proceeds via a pseudoliving free radical mechanism and provide branched resins of high, intermediate, or low molecular weights and with narrow polydispersities. The present invention provides branched polymer products with a latent thermally reactive or latent functional group on at least one end or terminus of the branched polymer and which latent functional group can be used for further reaction with for example, a free radical reactive branching agent, to prepare even more highly branched or extended linear polymeric chains with complex architectures. The present invention, in embodiments, provides branching and polymerization processes that enable control of resin molecular weight, weight distribution, modality of the products, the degree and extent of branching, molecular volume, and the like properties.

The present invention is directed, in embodiments, to pseudoliving polymerization processes which permit the economic preparation of branched narrow polydispersity resins with low, intermediate, or high molecular weights. The branched low molecular weight resins can be prepared without a chain transfer agent or molecular weight modifier by, for example, selecting appropriate ratios of reactants, which provides several advantages over conventional chain transfer mediated polymerization processes.

The stable free radical compound or agent selected for use in the present invention may be any known stable free radical agent which enables the objects and improvements of the present invention to be achieved. The aforementioned copending applications and commonly assigned patents disclose various stable free radical agents, including 2,2,6,6-tetramethy-1-piperidinyloxy free radical (TEMPO), and related nitroxyl stable free radical compounds. The aforementioned nitroxyl stable free radical compounds, and related derivatives, while quite satisfactory for the purpose of moderating the polymerization of a wide variety of different monomer and comonomer types, these compounds were found to be less effective at either higher temperatures or in the presence of acidic promoter compounds. The reduced effectiveness of the aforementioned nitroxyl stable free radical compounds at elevated temperatures or in the presence of acidic promoter compounds is believed to be attributable to known thermal and acidic instability, respectively, of these compounds. The instability of nitroxyl stable free radical compounds is documented in, for example, L. B. Volodarsky, V. A. Reznikov, and V. I. Ovcharenko, *Synthetic Chemistry of Stable Nitroxides*, CRC Press, Boca Raton, Fla., 1993 and also L. Berliner, *Spin Labeling Theory and Applications*, Academic Press, New York, 1976. The acidic instability of the nitroxide is believed to lead to, for example, conversion of the nitroxyl free radical functionality(=N—O•) to the corresponding ineffective hydroxyl amine compound (=N—OH). Thus, when thermal or acidic instability of the stable free radical compound becomes an issue, non-nitroxyl type stable free radical compounds can be selected to circumvent this problem, reference the aforementioned copending U.S. Pat. No. 5,530,079.

Although not desired to be limited by theory, it is believed that in order for stable free radical ( SFR ) compounds to function effectively in controlling free radical polymerization processes for the production of narrow polydispersities branched resins and elastomers, there are several critical conditions which the stable free radical compound must satisfy. One, for example, is that the SFR compound must form a stable bond, that is stable at temperatures less than about 60 to 100° C., with the free radical end of the growing polymer chain. Two, the bond between the SFR compound and the growing chain must be weak enough so that it is sufficiently thermally labile and thereby enabling the polymer-SFR bond to break in a reversible manner with heating to a reasonable reaction temperature, or by known alternative energetic means. For polystyrene, for example, a reasonable temperature should ideally be below the boiling point of the monomer, for example, of about 150° C. If the polymer-SFR bond is too stable at elevated temperatures, then the rate of bond breakage is too low or slow, and the polymerization rate becomes much too slow to be economically and industrially viable. If the bond breakage is too rapid, then the polymerization process becomes uncontrolled to the extent that the polydispersity of the resin increases to the levels of polydispersities found in conventional free radical polymerization processes thereby defeating or negating the purpose of employing a stable free radical agent or alternatively the incipient polymer product may be able to spontaneously depolymerize leading to non polymeric products.

Hydrophilic nitroxide stable free radical compounds are known, for example U.S. Pat. No. 5,264,204, discloses a magnetic resonance organ and tissue imaging method using these compounds, and a number of other suitable stable free radical compounds are available commercially and are readily accessible synthetically, for example, as disclosed in "Synthetic Chemistry of Stable Nitroxides", by L. B. Volodarsky et al., CRC Press, 1993, ISBN:0-8493-4590-1, the disclosures of which are incorporated by reference herein in their entirety. Various suitable hindered carbon-oxygen (C—O•) and related analog compounds of the nitroxide stable free radical compounds ( N—O•) which satisfy the necessary stability and reactivity requirements are readily evident from a detailed review of the aforementioned references and in combination with the disclosures of the present invention.

The monomers of the present invention can be polymerized in a variety of polymerization reaction media. The reaction mixture may contain from about 95 to about 98 percent by weight, preferably from about 5 to about 90 percent by weight, and most preferably from 10 to about 85 percent by weight monomer with the balance comprised of other reactants, reagents, comonomers, and optional solvents, diluents, or additives.

The branching polymerization reactions of the present invention can be supplemented with a solvent or cosolvent if desired to help ensure that the reaction mixture or at least the monomer containing portion remains a homogeneous single phase throughout the monomer conversion. Any solvent or cosolvent may be selected so long as the solvent media is effective in providing a solvent system which avoids precipitation or phase separation of the reactants or polymer products until after all the solution polymerization reactions have been completed. Exemplary solvent or cosolvents useful in the present invention may be selected from the group consisting of polymer product compatible aliphatic alcohols, glycols, ethers, glycol ethers, pyrrolidines, N-alkyl pyrrolidinones, N-alkyl pyrrolidones, polyethylene glycols, polypropylene glycols, amides, carboxylic acids and salts thereof, esters, organosulfides, sulfoxides, sulfones, alcohol derivatives, hydroxyether derivatives such as butyl CARBITOL™ or CELLOSOLVE™, amino alcohols, ketones, and the like, derivatives thereof, and mixtures thereof. Specific examples include ethylene glycol, propylene glycol, diethylene glycol, glycerine, dipropylene glycol, tetrahydrofuran, and the like, and mixtures thereof. When mixtures of water and water soluble or miscible organic liquids are selected as the reaction media, the water to cosolvent weight ratio typically ranges from about 100:0 to about 10:90, and preferably from about 97:3 to about 25:75.

Temperature of the polymerization may range from about 100° C. to about 250° C., preferably from about 110° C. to about 180° C. At temperatures below about 100° C., the reaction rate is slow and industrially impractical without the aid of an acid or base accelerating additive compound. At temperatures above about 250° C., conversion of the monomer into polymer decreases, and uncertain and undesirable by-products are formed. Frequently, these by-products discolor the polymer mixture and may necessitate a purification step to remove them or they may be intractable.

Since solvent and cosolvent admixtures can be used as the reaction media, the elevated temperatures of the polymerization require that the polymerization reactor be equipped to operate at elevated pressure. In general, it is preferred to conduct the polymerization at from about 10 to about 2,000 pounds per square inch (psi), and more preferably at from about 50 to about 1,000 psi.

The molecular weights referred to are measured by gel permeation chromatography using, for example, a polyethylene oxide standards for water soluble polymers and polystyrene standards for organic soluble polymers unless specifically stated otherwise.

Although not being desired to be limited by theory, it is believed that when branching polymerization reaction processes of the present invention are performed at a temperature at about or above 100° C., the exact temperature depending on the initiator used, all the polymer chains are expected to be initiated at about the same time. This is believed to be an important feature in forming uniform branch length polymer chain products having narrow polydispersities.

The aforementioned undesirable chain coupling or disproportionation termination reactions, so prevalent under the conditions of conventional art free radical polymerization systems, is believed to be suppressed under the conditions of the present invention because the effective instantaneous concentration and availability of living free chains is extremely small. In addition, stable free radical agents of the instant invention do not initiate polymerization so that new chains are not initiated after an initial period of less than about 1 to 2 hours during which time all polymer chains are initiated at about the same time.

Propagating chains of the present invention are referred to as pseudoliving because the stable free radical agent adds to a propagating chain and the chain is temporarily, but reversibly, terminated, reference the aforementioned U.S. Pat. No. 5,322,912. The term "protected" as used therein refers, for example, to the availability of the polymer chain radical species for selective rather than indiscriminant further reaction with monomer. An unmoderated free radical polymerization chain, that is, a free radical polymerization process without a stable free radical agent present as a reversible blocking group, in contrast, has a reactive or "open" polymer chain end throughout its lifetime which is typically irreversibly terminated on the order of seconds.

The present invention provides several specific advantages in embodiments as follows.

With the process of the present invention, branched polymer product polydispersities can be varied from between approximately 1.0 to approximately 2.0, or lower or higher if desired depending on the monomer/comonomer system by varying the ratio of stable free radical agent to free radical initiator molar concentration, and on the starting polymer or non-polymeric branching agent selected. When the polymerization process conditions of the present invention are attempted with bulky or sterically hindered, for example, alkyl acrylate type monomers without using the a stable free radical (SFR) agent additive, considerably broader molecular weight resins are obtained and autopolymerization effects are observed, or alternatively, no product polymer is formed.

During the reaction of monomer or mixtures of monomers to form polymers, the reaction time may be varied over about 30 minutes to 60 hours, preferably between about 2 to 10 hours and optimally about 3 to 7 hours. The optimal reaction time may vary depending upon the temperature, the volume and scale of the reaction, the extent and degree of branching, and the quantity and type of polymerization initiator and stable free radical agent selected.

The polymerization reaction temperature is preferably kept relatively constant throughout the heating of the reaction mixture by providing an adjustable external heat source and the temperature is from about 60° C. to about 250° C., and preferably between 100° C. and 200° C. and optimally in embodiments about 110° C. to 180° C. Reactions performed above 250° C. tend to result in a broadening of the polydispersity. A reaction volume may be selected for any size that enables simple adding, mixing, reacting, and isolating the branched product resins on an economic or convenient scale.

The stable free radical agent used for controlling polymerization processes of monomers or comonomers of the present invention can be any stable free radical compound which fulfills the above-mentioned criteria. These stable free radical agent materials are well known in the literature as free radical polymerization inhibitors or free radical scavengers, for example, the aforementioned sterically hindered and stable free radical compounds, reference *Macromolecules*, Vols I and II, H. G. Elias Ed., Plenum Publishers, Second Edition, New York, 1984. However, under the polymerization conditions of the present invention, the stable free radical agents function not as inhibitors but as moderators to harness the normally highly reactive and indiscriminate propagating intermediate free radical polymer chain species. Other suitable stable free radicals that may be used in conjunction with polymerizing monomers or comonomers in the polymerization processes of the present invention are disclosed in U.S. Pat. Nos. 3,600,169 and 5,324,604, the disclosures of which are incorporated by reference herein in their entirety. The stable free radical agents are preferably soluble in the monomer phase, where predominantly all the polymerization of monomers occurs. Stable free radical agents which have limited monomer solubility are still useful, but may require a monomer miscible cosolvent or else these stable free radical compounds tend to result in less predictable polymerization processes. If the stable free radical agent separates out of the monomer phase to any great extent then the balance desired between the mole ratio of the stable free radical agent, free radical initiator, and propagating free radical polymer chain species may be upset.

The molar ratio of the stable free radical (SFR) agent to free radical initiator (INIT) residing in the monomer phase is from about 0.5 to 5.0, and preferably in the range from about 0.4 to 4.0. Although not wanting to be limited by theory, in an embodiment, the molar ratio [SFR:INIT] of stable free radical agent, for example, 2,4,6-tri-tert-butyl phenoxy radical, to free radical initiator, for example, benzoyl peroxide is about 2.0 and is believed to be important for success of the process. If the [SFR:INIT] is too high then the reaction rate is noticeably inhibited. If the [SFR:INIT] is too low then the reaction product has undesired increased polydispersity.

In embodiments, the molar ratio of monomer content to stable free radical agent to free radical initiator is from about 6.0:0.2:1 to about 10,000:2.5:1 and preferably in the range of about 125:2.0:1 to about 7,000:1.3:1, for example, as used in preparing the aforementioned polymeric branching agents.

Processes of the present invention, in embodiments, provide for selective low, intermediate, and high monomer to polymer conversion rates, or degrees of polymerization, and preferably, for example, of 90 percent by weight or greater.

The low weight average molecular weight resin products having narrow polydispersity properties, as is also the situation with intermediate and high molecular weight products of the present invention, may be obtained without the use of a chain transfer agent.

Processes of the present invention, in embodiments also provide for relatively high weight average molecular weights, from weight average molecular weights ranging in size of from about 2,000 to about 200,000 while delivering narrow polydispersity branched products.

The monomers and comonomers that can be used, in embodiments, in the present invention are any monomer capable of undergoing a free radical polymerization and include but are not limited to styrene, substituted styrenes and derivatives thereof, for example, hydroxylated, halofenated, and alkylated styrenes, acrylates, butadiene, and any conjugated diene monomer sufficiently reactive under the aforespecified stable free radical moderated polymerization reaction conditions to afford a stable free radical reaction adduct and subsequently high molecular weight branched polymer products, for example, branched polymers of n-butyl acrylate, acrylic acid, and the like.

The polymerization reaction rate of the monomers may, in embodiments, be inhibited or accelerated and the reaction time influenced by the addition of a minor amount of a protic acid selected from the group consisting of inorganic acids, such as sulfuric, hydrochloric, and the like, and organic sulfonic and carboxylic acids. Although no definitive trend is presently evident, the added acid may have a profound or very little effect on the polymerization rate, depending upon a variety of reaction variables and conditions. Excessive addition of inorganic and organic acid beyond equimolar amounts compared to the stable free radical agent causes the resin polydispersity to broaden. In embodiments, the protic acid source may be in the form of an effective acid functional group such as carboxylic, sulfonic, phosphonic, and the like groups, contained in either the stable free radical agent or in the free radical initiator compound.

By cooling the polymerization reaction to below 60 to 80° C., the stable free radical moderated polymerization process is effectively quenched or terminated. Each new or subsequent addition of monomer accompanied by heating provides a new polymeric species having a narrow molecular weight distribution and each new polymer species continues to grow concurrently but independently of the other neighboring polymer species within the same polymer molecule. In the absence of continued heating, no new polymer product formation or chain elongation is observed.

Alternatively, branched block copolymer resins may also be prepared whereby after each desired block has been formed a new monomer or monomers is added, without the addition of more initiator or stable free radical agent, to form a new block wherein each block component is well defined in length and has a narrow molecular weight distribution and having properties depending on the repeated sequence and the monomers chosen for incorporation. Monomers added subsequent to the formation of the first formed branched thermoplastic resin or elastomer may be water soluble or water insoluble. Judicious selection of the water solubility properties of added monomers and the resulting polymeric segment enables convenient synthetic routes to branched block and multiblock copolymers with narrow polydispersities that are useful, for example, as surfactants, resin compatibilizers, such as "molecular velcro" and the like, viscosity modifiers, emulsifiers, and the like.

The branched polymeric products of the present invention may be optionally crosslinked with, for example, known crosslinking, coupling, or curing agents such as divinyl benzene and the like, either in situ or in a separate post polymerization process step.

Additional optional known additives may be used in the polymerization reactions which do not interfere with the objects of the invention and which may provide additional performance enhancements to the resulting branched product, for example, colorants, lubricants, release or transfer agents, surfactants, stabilizers, antifoams, antioxidants, and the like.

Polymer resins possessing a discrete mixture of monomodal, that is a well defined multimodal molecular weight distribution may in embodiments thereof provide several advantages, particularly for electrophotographic toner compositions such as: melt rheology properties including improved flow and elasticity; and improved performance properties such as triboelectrification, admix rates, and shelf life stabilities.

In the aforementioned U.S. Pat. No. 5,322,912, there is disclosed a monomer polymerized in bulk or in the absence of a solvent or diluent, that is neat, using a mixture of styrene monomer, a free radical initiator, and a stable free radical agent at constant temperature. A plot of weight percent monomer conversion versus number average molecular weight indicates that a nearly linear relationship holds for bulk polymerization reaction media using stable free radical agent moderated processes and which relationship is believed to be operative in the present invention. Thus, the Trommsdorff effect, that is, known exothermic heating or autoacceleration of the monomer conversion reaction rate and randomization of molecular weights observed in unmoderated free radical polymerization reactions is effectively suppressed in aqueous or nonaqueous polymerization processes of the present invention even at high solids content, high conversion, and elevated temperature free radical initiated polymerization reactions.

Toner compositions can be prepared by a number of known methods, such as admixing and heating resin particles obtained with the processes of the present invention such as water soluble styrene butadiene copolymer derivatives, pigment particles such as magnetite, carbon black, or mixtures thereof, and cyan, yellow, magenta, green, brown, red, or mixtures thereof, and preferably from about 0.5 percent to about 5 percent of charge enhancing additives in a toner extrusion device, such as the ZSK53 available from Werner Pfleiderer, and removing the formed toner composition from the device. Subsequent to cooling, the toner composition is subjected to grinding utilizing, for example, a Sturtevant micronizer for the purpose of achieving toner particles with a volume median diameter of less than about 25 microns, and preferably of from about 6 to about 12 microns, which diameters are determined by a Coulter Counter. Subsequently, the toner compositions can be classified utilizing, for example, a Donaldson Model B classifier for the purpose of removing toner fines, that is toner particles less than about 4 microns volume median diameter.

Illustrative examples of resins suitable for toner and developer compositions of the present invention include branched styrene acrylates, styrene methacrylates, styrene butadienes, vinyl resins, including branched homopolymers and copolymers of two or more vinyl monomers; vinyl monomers include styrene, p-chlorostyrene, butadiene, isoprene, and myrcene; vinyl esters like esters of monocarboxylic acids including methyl acrylate, ethyl acrylate, n-butyl acrylate, isobutyl acrylate, dodecyl acrylate, n-octyl acrylate, phenyl acrylate, methyl methacrylate, ethyl methacrylate, and butyl methacrylate; acrylonitrile, methacrylonitrile, acrylamide; and the like. Preferred toner resins include styrene butadiene copolymers, mixtures thereof, and the like. Other preferred toner resins include styrene-n-butyl acrylate copolymers, PLIOLITES®; suspension polymerized styrene butadienes, reference U.S. Pat. No. 4,558,108, the disclosure of which is totally incorporated herein by reference.

In toner compositions, the resin particles are present in a sufficient but effective amount, for example from about 70 to about 90 weight percent. Thus, when 1 percent by weight of the charge enhancing additive is present, and 10 percent by weight of pigment or colorant, such as carbon black, is contained therein, about 89 percent by weight of resin is selected. Also, the charge enhancing additive may be coated on the pigment particle. When used as a coating, the charge enhancing additive is present in an amount of from about 0.1 weight percent to about 5 weight percent, and preferably from about 0.3 weight percent to about 1 weight percent.

Numerous well known suitable pigments or dyes can be selected as the colorant for the toner particles including, for example, carbon black like REGAL 330®, nigrosine dye, aniline blue, magnetite, or mixtures thereof. The pigment, which is preferably carbon black, should be present in a sufficient amount to render the toner composition highly colored. Generally, the pigment particles are present in amounts of from about 1 percent by weight to about 20 percent by weight, and preferably from about 2 to about 10 weight percent based on the total weight of the toner composition; however, lesser or greater amounts of pigment particles can be selected.

When the pigment particles are comprised of magnetites, thereby enabling single component toners in some instances, which magnetites are a mixture of iron oxides (FeO.Fe$_2$O$_3$) including those commercially available as MAPICO BLACK®, they are present in the toner composition in an amount of from about 10 percent by weight to about 70 percent by weight, and preferably in an amount of from about 10 percent by weight to about 50 percent by weight. Mixtures of carbon black and magnetite with from about 1 to about 15 weight percent of carbon black, and preferably from about 2 to about 6 weight percent of carbon black, and magnetite, such as MAPICO BLACK®, in an amount of, for example, from about 5 to about 60, and preferably from about 10 to about 50 weight percent can be selected.

There can also be blended with the toner compositions of the present invention external additive particles including flow aid additives, which additives are usually present on the surface thereof. Examples of these additives include colloidal silicas, such as AEROSIL®, metal salts and metal salts of fatty acids inclusive of zinc stearate, aluminum oxides, cerium oxides, and mixtures thereof, which additives are generally present in an amount of from about 0.1 percent by weight to about 5 percent by weight, and preferably in an amount of from about 0.1 percent by weight to about 1 percent by weight. Several of the aforementioned additives are illustrated in U.S. Pat. Nos. 3,590,000 and 3,800,588, the disclosures of which are totally incorporated herein by reference.

With further respect to the present invention, colloidal silicas, such as AEROSIL®, can be surface treated with the charge additives in an amount of from about 1 to about 30 weight percent and preferably 10 weight percent followed by the addition thereof to the toner in an amount of from 0.1 to 10 and preferably 0.1 to 1 weight percent.

Also, there can be included in the toner compositions low molecular weight waxes, such as polypropylenes and polyethylenes commercially available from Allied Chemical and Petrolite Corporation, EPOLENE N-15® commercially available from Eastman Chemical Products, Inc., VISCOL 550-P®, a low weight average molecular weight polypropylene available from Sanyo Kasei K. K., and similar materials. The commercially available polyethylenes selected have a molecular weight of from about 1,000 to about 1,500, while the commercially available polypropylenes utilized for the toner compositions are believed to have a molecular weight of from about 4,000 to about 5,000. Many of the polyethylene and polypropylene compositions useful in the present invention are illustrated in British Patent No. 1,442,835, the disclosure of which is totally incorporated herein by reference.

The low molecular weight wax materials are optionally present in the toner composition or the polymer resin beads of the present invention in various amounts, however, generally these waxes are present in the toner composition in an amount of from about 1 percent by weight to about 15 percent by weight, and preferably in an amount of from about 2 percent by weight to about 10 percent by weight and may in embodiments function as fuser roll release agents.

Encompassed within the scope of the present invention are colored toner and developer compositions comprised of toner resin particles, carrier particles, the charge enhancing additives illustrated herein, and as pigments or colorants red, blue, green, brown, magenta, cyan and/or yellow particles, as well as mixtures thereof. More specifically, with regard to the generation of color images utilizing a developer composition with charge enhancing additives, illustrative examples of magenta materials that may be selected as pigments include, for example, 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of cyan materials that may be used as pigments include copper tetra-4-(octadecyl sulfonamido) phthalocyanine, X-copper phthalocyanine pigment listed in the Color Index as CI 74160, CI Pigment Blue, and Anthrathrene Blue, identified in the Color Index as Cl 69810, Special Blue X-2137, and the like; while illustrative examples of yellow pigments that may be selected are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33, 2,5-dimethoxy-4-sulfonanilide phenylazo-4'-chloro-2,5-dimethoxy acetoacetanilide, and Permanent Yellow FGL. The aforementioned pigments are incorporated into the toner composition in various suitable effective amounts providing the objectives of the present invention are achieved. In one embodiment, these colored pigment particles are present in the toner composition in an amount of from about 2 percent by weight to about 15 percent by weight calculated on the weight of the toner resin particles.

For the formulation of developer compositions, there are mixed with the toner particles carrier components, particularly those that are capable of triboelectrically assuming an opposite polarity to that of the toner composition. Accordingly, the carrier particles are selected to be of a negative polarity enabling the toner particles, which are positively charged, to adhere to and surround the carrier particles. Illustrative examples of carrier particles include iron powder, steel, nickel, iron, ferrites, including copper zinc ferrites, and the like. Additionally, there can be selected as carrier particles nickel berry carriers as illustrated in U.S. Pat. No. 3,847,604, the disclosure of which is totally incorporated herein by reference. The selected carrier particles can be used with or without a coating, the coating generally containing terpolymers of styrene, methylmethacrylate, and a silane, such as triethoxy silane, reference U.S. Pat. No. 3,526,533, U.S. Pat. No. 4,937,166, and U.S. Pat. No. 4,935,326, the disclosures of which are totally incorporated herein by reference, including for example KYNAR® and polymethylmethacrylate mixtures (40/60). Coating weights can vary as indicated herein; generally, however, from about 0.3 to about 2, and preferably from about 0.5 to about 1.5 weight percent coating weight is selected.

Furthermore, the diameter of the carrier particles, preferably spherical in shape, is generally from about 50 microns to about 1,000 microns, and in embodiments about 175 microns thereby permitting them to possess sufficient density and inertia to avoid adherence to the electrostatic images during the development process. The carrier component can be mixed with the toner composition in various suitable combinations, however, best results are obtained when about 1 to 5 parts per toner to about 10 parts to about 200 parts by weight of carrier are selected.

The toner composition of the present invention can be prepared by a number of known methods as indicated herein including extrusion melt blending the toner resin particles, pigment particles or colorants, and a charge enhancing additive, followed by mechanical attrition. Other methods include those well known in the art such as spray drying, melt dispersion, emulsion aggregation, and extrusion processing. Also, as indicated herein the toner composition without the charge enhancing additive in the bulk toner can be prepared, followed by the addition of charge additive surface treated colloidal silicas.

The toner and developer compositions may be selected for use in electrostatographic imaging apparatuses containing therein conventional photoreceptors providing that they are capable of being charged positively or negatively. Thus, the toner and developer compositions can be used with layered photoreceptors that are capable of being charged negatively, such as those described in U.S. Pat. No. 4,265,990, the disclosure of which is totally incorporated herein by reference. Illustrative examples of inorganic photoreceptors that may be selected for imaging and printing processes include selenium; selenium alloys, such as selenium arsenic, selenium tellurium and the like; halogen doped selenium substances; and halogen doped selenium alloys.

The toner compositions are usually jetted and classified subsequent to preparation to enable toner particles with a preferred average diameter of from about 5 to about 25 microns, and more preferably from about 8 to about 12 microns. Also, the toner compositions preferably possess a triboelectric charge of from about 0.1 to about 2 femtocoulombs per micron as determined by the known charge spectrograph. Admix time for toners are preferably from about 5 seconds to 1 minute, and more specifically from about 5 to about 15 seconds as determined by the known charge spectrograph. These toner compositions with rapid admix characteristics enable, for example, the development of images in electrophotographic imaging apparatuses, which images have substantially no background deposits thereon, even at high toner dispensing rates in some instances, for instance exceeding 20 grams per minute; and further, such toner compositions can be selected for high speed electrophotographic apparatuses, that is those exceeding 70 copies per minute.

Also, the toner compositions prepared from resins of the present invention possess desirable narrow charge distributions, optimal charging triboelectric values, preferably of from 10 to about 40, and more preferably from about 10 to about 35 microcoulombs per gram as determined by the known Faraday Cage methods with from about 0.1 to about 5 weight percent in one embodiment of the charge enhancing additive; and rapid admix charging times as determined in the charge spectrograph of less than 15 seconds, and more preferably in some embodiments from about 1 to about 14 seconds.

Figure 3:
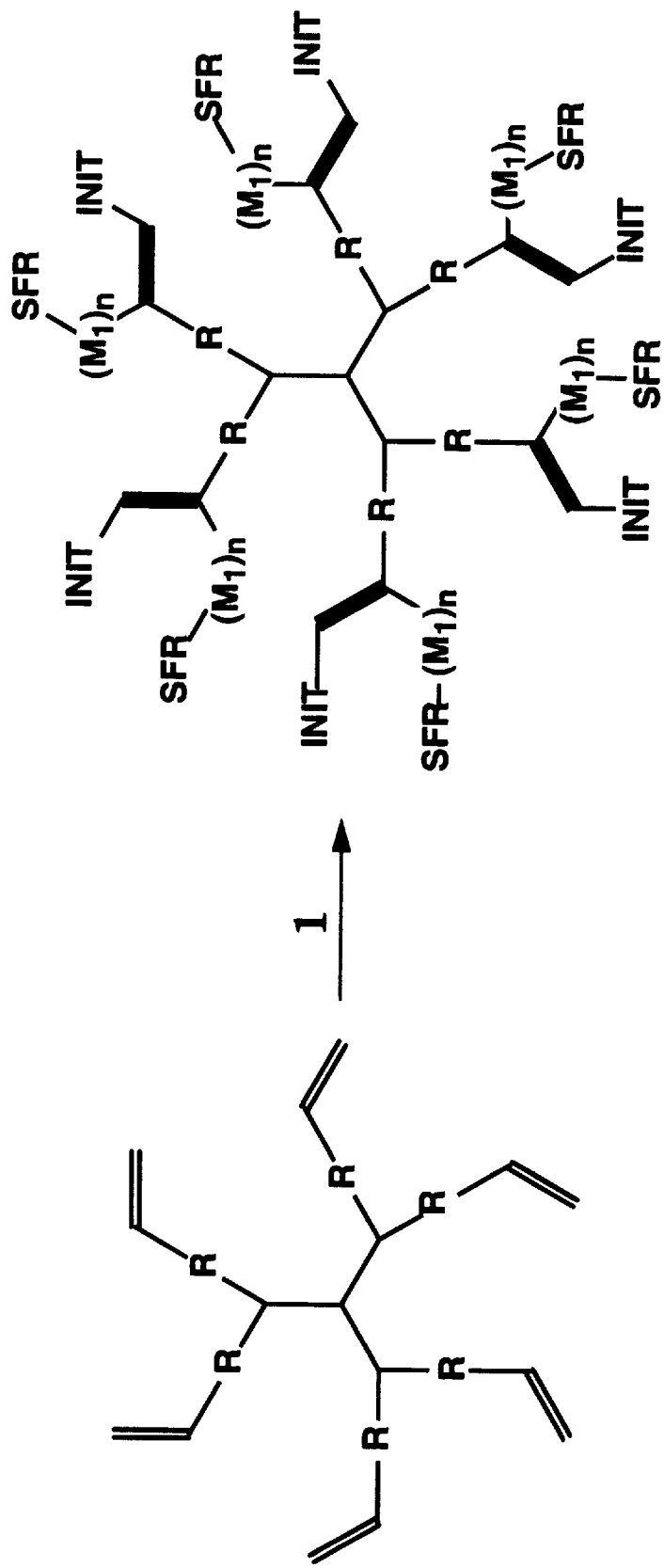
FIG. 3 illustrates another exemplary linear synthetic embodiment for preparing branched or star polymers of the present invention.

With reference to FIGS. 1 and 3 the reaction conditions designated by reference numeral 1 are: 1) the addition with heating of a stable free radical agent and a free radical initiator to the unsaturated resin or core; and 2) the addition with heating of one or more monomers.

Figure 2:
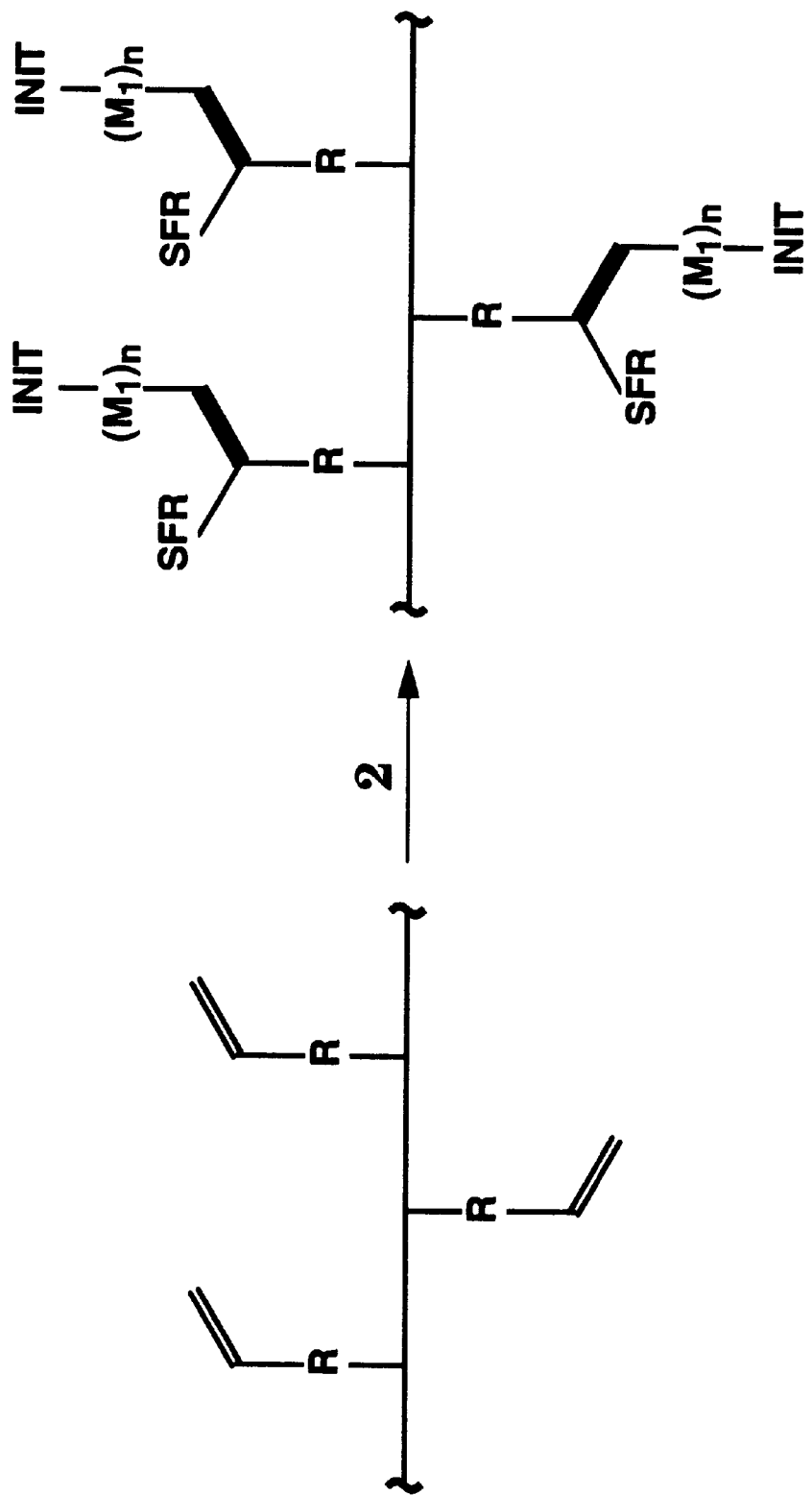
FIG. 2 illustrates an exemplary convergent synthetic embodiment for preparing branched polymers of the present invention.
Figure 4:
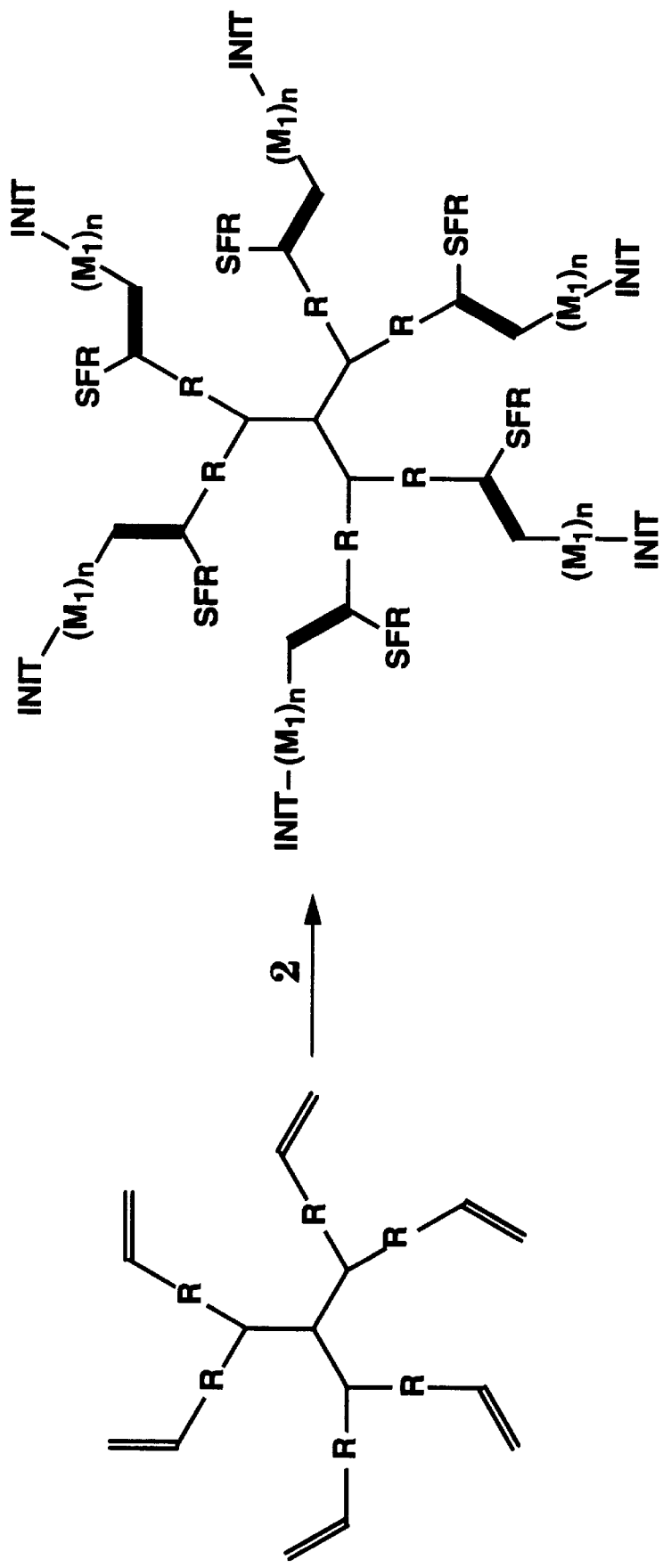
FIGS. 4 illustrates another exemplary convergent synthetic embodiment for preparing branched or star polymers of the present invention.
Figure 5:
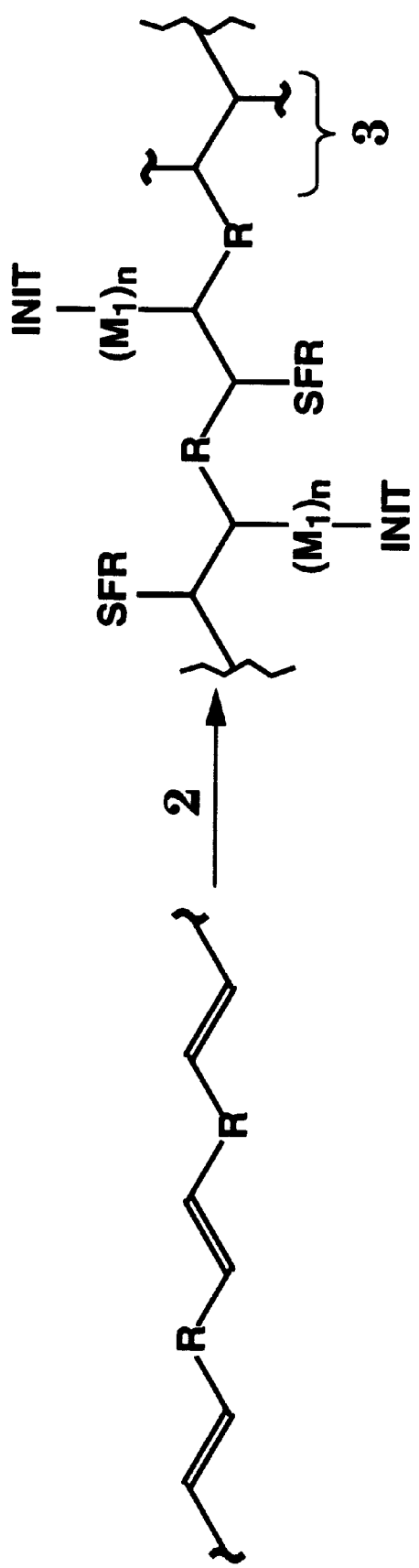
FIGS. 5 illustrates another exemplary linear synthetic embodiment for preparing linear branched polymers of the present invention.

With reference to FIGS. 2, 4, and 5 the reaction conditions designated by reference numeral 2 are: 1) the addition with heating of a stable free radical terminated polymer or polymeric branching agent of the formula I—$(M_1)_n$—SFR where I is a free radical initiator fragment, $(M_1)$ is a polymeric segment derived from the monomer $M_1$, n is an integer from 1 to 10,000 and represents the number of polymerized monomers in the oligomer or polymer and —SFR is a covalently bonded stable free radical agent; and cooling the mixture, wherein the resulting product is a branched thermoplastic resin with arms or branches of the formula —$(M_1)_n$—I with substantially uniform length and narrow polydispersity, and SFR is covalently bonded to the unsaturated resin.

Following the above teaching there are also provided, in embodiments of the present invention, a method and polymer comprising a branched thermoplastic resin or elastomer of the formula $[I—(M_1)_n—]_m—[P]—[—(M_2)_n—(SFR)]_m$ prepared by the process of claim 35, where P is an unsaturated thermoplastic resin which has been reacted with at least one branching agent oligomer or polymer of the formula I—$(M_1)_n$—SFR where I is a free radical initiator fragment, $(M_1)$ is a polymeric segment derived from the monomer $M_1$, n is an integer from 1 to 10,000 and represents the number of polymerized monomers in the branching agent oligomer or polymer, $(M_2)$ is a polymeric segment derived from the monomer $M_2$, n is an integer from 1 to 10,000 and represents the number of monomer or mixture of monomers polymerized or appended to the resin backbone by insertion at the bond between the unsaturated resin and the SFR group, —SFR is a covalently bonded stable free radical agent attached to the end of the added monomer chain or segment $(M_2)n$, and where m is an integer from 1 to about 50,000.

The following Examples are being supplied to further define various species of the present invention, it being noted that these Examples are intended to illustrate and not limit the scope of the present invention. Parts and percentages are by weight unless otherwise indicated.

EXAMPLE I

Preparation of Rod-Shaped or Star Polymer

A rod-shaped core molecule containing from 2 to about 1,000,000 pendant vinyl moieties on a hydrocarbon backbone is used as the starting point for this reaction. Reaction with styrene, BPO and TEMPO as described in the model example reactions below provide side chains of uniform length. Polymerization of divinyl benzene has been described, for example, in the aforementioned Eschway et al., reference and is incorporated herein by reference in its entirety. This reaction is depicted in FIG. 1 and 3.

EXAMPLE II

Preparation of a Spherical Star Polymer

Uniform chains of active polymer are prepared as described in the previous example. Spherical cores contained vinyl groups on the surface have been described by Tomalia et al.(8) Reaction of these substrates via a stable free radical process with the active chains described above can graft the uniform strands onto the surface providing an overall spherical topology. A model demonstration of the uniformity of this polymerization reaction is illustrated in the model reaction below.

EXAMPLE III

Model Reaction 1

Reaction of styrene with benzoyl peroxide (BPO) and 2,2,6,6-tetramethyl-1-piperinyloxy (TEMPO), under argon, at 95° C. for 3.5 hours, followed by heating at 123° for 69 hours yielded a TEMPO terminated polystyrene branching agent with a polydispersity of 1.26. This narrow polydispersity means that all of these independent chains are very nearly the same length. The TEMPO terminated polystyrene branching agent is reacted with a suitable unsaturated rod or spherical core molecule described above to provide a branched product wherein the branch lengths are substantially all of the same length.

EXAMPLE IV

Model Reaction 2

A suspension copolymerization of styrene (86% by weight) and butadiene with BPO and TEMPO yielded a TEMPO terminated copolymer with a polydispersity of 1.36 under reaction conditions similar to those reported in Model Reaction 1. The TEMPO terminated polystyrene-butadiene branching agent is reacted with a suitable unsaturated rod or spherical core molecule described above to provide a branched product wherein the branch lengths are substantially all of the same length.

EXAMPLE V

Preparation of Pseudoliving Polystyrene

A solution of TEMPO ( 1.54 g, from Aldrich Chemicals) in styrene (91.5 g) was heated, under argon, in an oil bath to 145° C. A solution of LUPERSOL 2531 (1.93 g, a free radical initiator) in styrene (5 g) was added and the reaction was allowed to proceed for 7 hours. The polystyrene product was isolated by precipitation in methanol and had an Mn=6,200, Mw=9,900, and a polydispersity of 1.6.

Reaction of Pseudoliving Polystyrene with Unsaturated Polyester Resin

Figure 6:
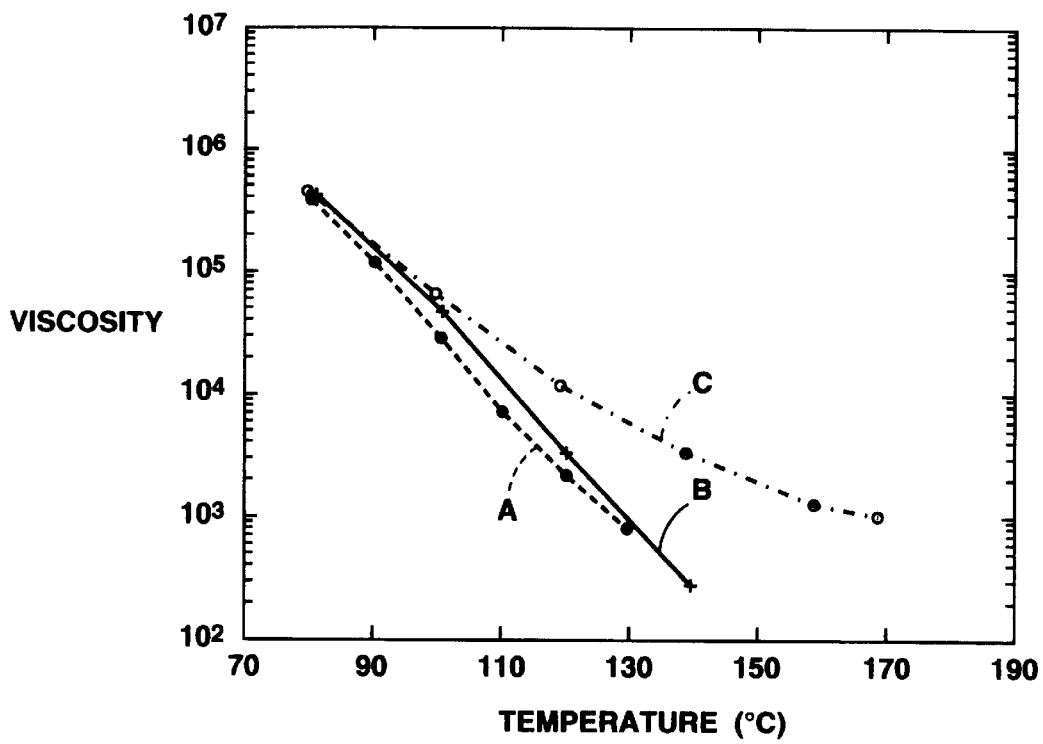
FIGS. 6 illustrates exemplary viscosity property modification of the branched polymers of the present invention.
Figure 7:
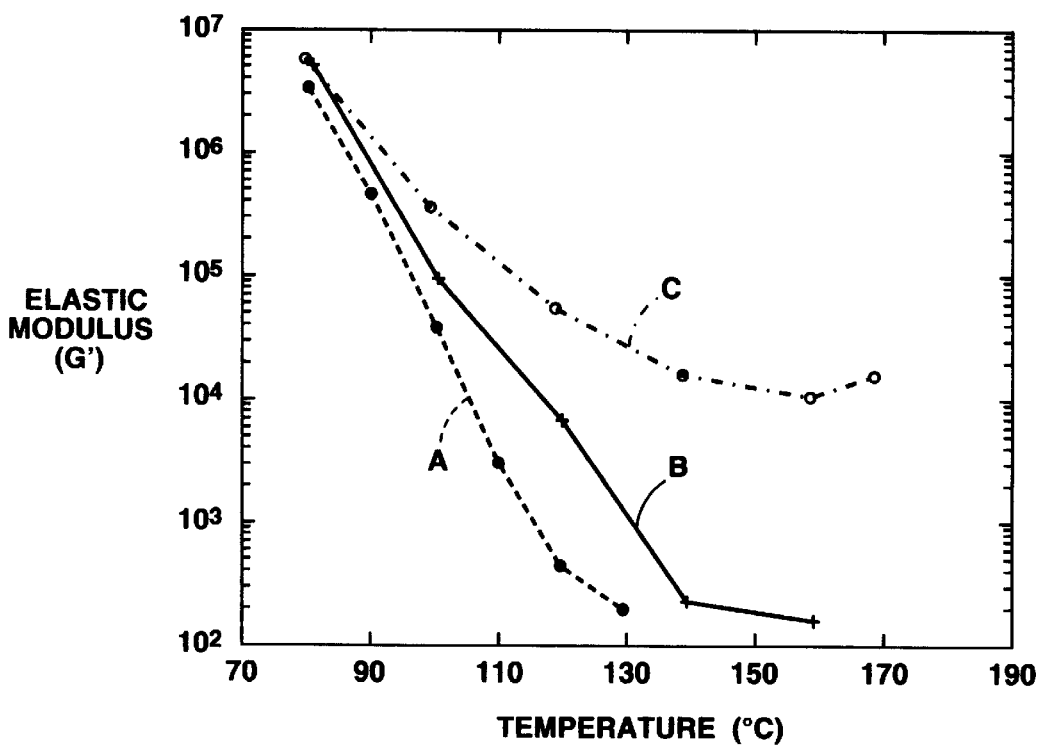
FIGS. 7 illustrates exemplary elastic modulus property modification of the branched polymers of the present invention.

Pseudoliving TEMPO terminated polystyrene (12 g ) prepared above, SPAR II unsaturated polyester resin (46 g, available from Goodyear) and camphor sulfonic acid (1 g ) were physically blended together and reacted in a Haake blender for 1 hour at 200° C. and 100 rpm. The blender was cooled and the product was scrapped from the reactor. The product had an Mn=4,800, an Mw=107,000, and a polydispersity of 22.3. The Theological properties of the resulting branched resin (Curve C) are shown in the plots of FIG. 6 and 7 which show a dramatic increase in the dynamic viscosity (FIG. 6) and an even larger change in the elastic modulus G' (FIG. 7) compared to the commercially available SPAR II prior to the branching polymerization reaction (Curve A) and an equivalent weight percent blend of the commercially available SPAR II resin and the pseudoliving polystyrene(Curve B).

EXAMPLE VI

Magnetic Toner Preparation and Evaluation

The polymer resin (74 weight percent of the total mixture) obtained by the stable free radical polymerization processes in Example I may be melt extruded with 10 weight percent of REGAL 330® carbon black and 16 weight percent of MAPICO BLACK® magnetite at 120° C., and the extrudate pulverized in a Waring blender and jetted to 8 micron number average sized particles. A positively charging magnetic toner may be prepared by surface treating the jetted toner (2 grams) with 0.12 gram of a 1:1 weight ratio of AEROSIL R972® (Degussa) and TP-302 a naphthalene sulfonate and quaternary ammonium salt (Nachem/Hodogaya SI) charge control agent.

Developer compositions may then be prepared by admixing 3.34 parts by weight of the aforementioned toner composition with 96.66 parts by weight of a carrier comprised of a steel core with a polymer mixture thereover containing 70 percent by weight of KYNAR®, a polyvinylidene fluoride, and 30 percent by weight of polymethyl methacrylate; the coating weight being about 0.9 percent. Cascade development may be used to develop a Xerox Model D photoreceptor using a "negative" target. The light exposure may be set between 5 and 10 seconds and a negative bias used to dark transfer the positive toned images from the photoreceptor to paper.

Fusing evaluations may be carried out with a Xerox Corporation 5028® soft silicone roll fuser, operated at 7.62 cm (3 inches) per second.

The minimum fix and hot offset temperatures of stable free radical polymerization polymers having narrow polydispersities as toners are expected to be improved over toners prepared from resins synthesized by a free radical polymerization process without a stable free radical agent present which afford broader polydispersities. The actual fuser roll temperatures may be determined using an Omega pyrometer and was checked with wax paper indicators. The degree to which a developed toner image adhered to paper after fusing is evaluated using a Scotch® tape test. The fix level is expected to be excellent and comparable to that fix obtained with toner compositions prepared from other methods for preparing toners having resins with high molecular weights and narrow polydispersities. Typically greater than 95 percent of the toner image remains fixed to the copy sheet after removing a tape strip as determined by a densitometer. Alternatively, the fixed level may be quantitated using the known crease test, reference the aforementioned U.S. Pat. No. 5,312,704.

Images may be developed in a xerographic imaging test fixture with a negatively charged layered imaging member comprised of a supporting substrate of aluminum, a photogenerating layer of trigonal selenium, and a charge transport layer of the aryl amine N,N'-diphenyl-N,N'-bis(3-methylphenyl)1,1'-biphenyl-4,4'-diamine, 45 weight percent, dispersed in 55 weight percent of the polycarbonate MAKROLON®, reference U.S. Pat. No. 4,265,990, the disclosure of which is totally incorporated herein by reference; images for toner compositions prepared from the copolymers derived from for example, Example XI are expected to be of excellent quality with no background deposits and of high resolution over an extended number of imaging cycles exceeding, it is believed, about 75,000 imaging cycles.

Other toner compositions may be readily prepared by conventional means from the branched polymer and copolymer resins of the present invention including colored toners, single component toners, multi-component toners, toners containing special performance additives, and the like.

The branched polymers and copolymers of the present invention find utility in a wide variety of applications such as the improvement of the rheological properties of thermoplastic resins by blending in polystyrene star polymers, improving the compatibility of polymer blend by adding small amounts of the branched polymers as compatilizing agents, improving the viscosity index of lubricating oils, the use of these materials as a dispersant and improving the impact strength of polyphenylene ether resins. The stable free radical agent moderated homopolymer and copolymer branching polymerization processes of the present invention may be applied to a wide range of organic monomers to provide novel toner resin materials with desirable electrophotographic properties. For example, branching block copolymers have application as dispersants for photoreceptor pigments. The branched multimodal resins have application to low melt resins and certain monomodal resins may be used to modify the surface of carbon black and pigment particles to make the pigment particles more miscible with a host polymer or dispersing medium. Narrow molecular weight branched resins such as poly(n-butyl acrylate) branched poly(styrene butadiene) find applications as improved toner resins for general application and particularly for detoning or deinking applications which may be achieved by heating at elevated temperatures in aqueous alkali solutions, and as "molecular velcro" compounds.

The aforementioned patents and publications are incorporated by reference herein in their entirety.

Other modifications of the present invention may occur to those skilled in the art based upon a review of the present application and these modifications, including equivalents thereof, are intended to be included within the scope of the present invention.

What is claimed is:

1. A process for the preparation of branched thermoplastic resins comprising:

heating a mixture of an unsaturated resin, a free radical initiator, and a stable free radical agent, wherein a free radical initiator fragment and the stable free radical agent add to unsaturated bonds of the unsaturated resin;

adding to the heated mixture at least one polymerizable monomer;

adding a crosslinking agent to the polymerization after substantially all the monomer has been polymerized, wherein the crosslinking agent is a disubstituted olefin; and cooling the mixture, wherein the resulting product is a branched thermoplastic resin with arms or branches comprised of polymerized monomer with substantially uniform length and narrow polydispersity.

2. A process for the preparation of branched thermoplastic resins comprising:

heating a mixture of an unsaturated resin, a free radical initiator, and a stable free radical agent, wherein a free radical initiator fragment and the stable free radical agent add to unsaturated bonds of the unsaturated resin;

adding to the heated mixture at least one polymerizable monomer;

cooling the mixture, wherein the resulting product is a branched thermoplastic resin with arms or branches comprised of polymerized monomer with substantially uniform length and narrow polydispersity; and forming solid toner particles from the branched thermoplastic resin by melt mixing the resin with pigment particles and a charge additive and thereafter grinding and classifying the resulting toner particles.

3. A process for the preparation of branched thermoplastic resins comprising: heating a mixture of an unsaturated resin, and a covalently bonded stable free radical containing, narrow polydispersity, pseudoliving branching agent oligomer or polymer of the formula

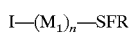

I—(M$_1$)$_n$—SFR where I is a free radical initiator fragment, (M$_1$) is a polymeric segment derived from the monomer M$_1$, n is an integer from 1 to 10,000 and represents the number of polymerized monomers in the oligomer or polymer and —SFR is a covalently bonded stable free radical agent; and cooling the mixture, wherein the resulting product is a branched thermoplastic resin with arms or branches of the formula —(M$_1$)$_n$—I with substantially uniform length and narrow polydispersity, and SFR is covalently bonded to the unsaturated resin.

4. A process in accordance with claim 3 further comprising heating the resulting branched resin with additional free radical reactive monomer or a mixture of monomers, wherein the additional monomer or mixture of monomers are polymerized or appended to the resin backbone by insertion at the bond between the unsaturated resin and the SFR group to form new arm or branches, and wherein the product has a covalently bonded stable free radical agent on the terminus of the newly formed arms or branches.

5. A process for the preparation of dendrimer or star thermoplastic resins comprising: heating a mixture of an olefinic branching agent of the formula C(R)$_n$H$_{n-4}$ where n is a number from 3 to 4 and R represents monoolefin containing substituents with from 2 to 25 carbon atoms, a free radical initiator, and a stable free radical agent, to from a stable free radical activated branching agent of the formula C(R')$_n$H$_{n-4}$ where n is a branch number from 3 to 4 and R' represents saturated substituents in the branching agent which have reacted with, and incorporated therein, a free initiator fragment and a stable free radical agent; heating the stable free radical activated branching agent with at least one monomer; and cooling the mixture, wherein the resulting product is a thermoplastic polymeric dendrimer or star compound of the formula C(R")$_n$H$_{n-4}$ where n is an integer from 3 to 4, and R" represents the branch substituents or arms including the polymerized monomer incorporated therein and wherein each arm has a substantially uniform arm length, narrow polydispersity, and a stable free radical agent covalently bonded to the end of each arm.

6. A process according to claim 5 further comprising heating the resulting dendrimer or star thermoplastic resin, before or after said cooling, with a second olefinic branching agent of the formula C(R)$_n$H$_n$-4 where n is a number from 3 to 4 and each R represents a monoolefin containing substituent with from 2 to 25 carbon atoms, and thereafter heating with a monomer or mixture of monomers, which monomer or mixture of monomers are the same or different from the monomer of the first monomer polymerization.

7. A process in accordance with claim 5 further comprising heating the resulting dendrimer or star thermoplastic resin with a branching agent selected form the group consisting of the formulas

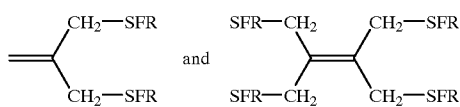

where —SFR is a covalently bonded stable free radical agent, and thereafter heating with a monomer or mixture of monomers, which monomer or mixture of monomers are the same or different from the monomer of the first monomer polymerization.

* * * * *